(12) United States Patent
Aritomi

(10) Patent No.: US 9,041,961 B2
(45) Date of Patent: May 26, 2015

(54) SYSTEM, INFORMATION PROCESSING APPARATUS, INFORMATION PROCESSING METHOD, AND STORAGE MEDIUM INCLUDING AN IMPROVED FUNCTION FOR ADDING INFORMATION USED TO SORT SCANNED DATA

(71) Applicant: CANON KABUSHIKI KAISHA, Tokyo (JP)

(72) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 13/902,007

(22) Filed: May 24, 2013

(65) Prior Publication Data

US 2013/0314745 A1 Nov. 28, 2013

(30) Foreign Application Priority Data

May 28, 2012 (JP) .................................. 2012-120872

(51) Int. Cl.
*G06F 3/12* (2006.01)
*H04N 1/00* (2006.01)

(52) U.S. Cl.
CPC ....... *H04N 1/00209* (2013.01); *H04N 1/00222* (2013.01); *H04N 1/00225* (2013.01); *H04N 1/00228* (2013.01); *H04N 1/00408* (2013.01); *H04N 1/00482* (2013.01)

(58) Field of Classification Search
CPC .......... H04N 1/00209; H04N 1/00222; H04N 1/00225; H04N 1/00228; H04N 1/00408; H04N 1/00482
USPC ......................................................... 358/1.15
See application file for complete search history.

(56) References Cited

U.S. PATENT DOCUMENTS

2002/0085244 A1* 7/2002 Blasio et al. .................. 358/474

FOREIGN PATENT DOCUMENTS

| JP | 2007-188479 A | 7/2007 |
|---|---|---|
| JP | 2008-005344 A | 1/2008 |

* cited by examiner

*Primary Examiner* — Fred Guillermety
(74) *Attorney, Agent, or Firm* — Canon U.S.A., Inc., IP Division

(57) ABSTRACT

An information processing apparatus sets a sorting information list and a sorting method used for a sort operation, and transmits the sorting information list set to an image forming apparatus. The image forming apparatus displays a selection screen on which a user can select sorting information from the sorting information list, and transmits the sorting information selected on the selection screen to the information processing apparatus, and transmits scanned data to the information processing apparatus. The information processing apparatus sorts the scanned data using the sorting information based on the sorting method set.

9 Claims, 17 Drawing Sheets

SYSTEM, INFORMATION PROCESSING APPARATUS, INFORMATION PROCESSING METHOD, AND STORAGE MEDIUM INCLUDING AN IMPROVED FUNCTION FOR ADDING INFORMATION USED TO SORT SCANNED DATA

BACKGROUND OF THE INVENTION

1. Field of the Invention

The present invention relates to a system, an information processing apparatus, an information processing method, and a storage medium.

2. Description of the Related Art

When business documents are scanned in the course of work, a user usually stores scanned data in a personal computer (PC). For example, there is a system in which a user can select a file shared folder of a PC displayed on an operation panel of a multifunction peripheral (MFP) and store scanned data (file) in the selected folder. In such a system, the file is allocated to the folder and stored with a file name such as serial date number. Meanwhile, the widespread of Web services has changed user environments. Moreover, data management such as information arrangement using a tag and flat storage of data to a large capacity storage has been changed. Japanese Patent Application Laid-Open No. 2008-5344 discusses a tag setting technique. According to the tag setting technique discussed in Japanese Patent Application Laid-Open No. 2008-5344, aliases are displayed on a camera operation unit, and a tag corresponding to a selected alias is added to an image to store the image in a memory.

The conventional system enabling the scanned data to be stored in the shared folder of the PC has a problem of labor-saving. For example, classification of the scanned data by folders causes difficulty in referring to a file when hierarchical levels cannot be followed, or when a hierarchical level is crossed. Moreover, since an information position is fixed, a file cannot be moved.

SUMMARY OF THE INVENTION

The present invention is directed to enhancement of labor-saving when scanned data is sorted and stored in an information processing apparatus.

According to an aspect of the present invention, a system includes an information processing apparatus and an image forming apparatus, the information processing apparatus including a setting unit configured to set a sorting information list and a sorting method used for a sort operation, and a list transmission unit configured to transmit the sorting information list set by the setting unit to the image forming apparatus, and the image forming apparatus including a display unit configured, based on the sorting information list transmitted by the list transmission unit, to display a selection screen on which a user can select sorting information from the sorting information list, a sorting information transmission unit configured to transmit the sorting information selected on the selection screen to the information processing apparatus, and a scanned data transmission unit configured to transmit scanned data to the information processing apparatus, wherein the information processing apparatus further includes a sorting unit configured to sort the scanned data using the sorting information based on the sorting method set by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

(System Configuration)

Figure 1A:
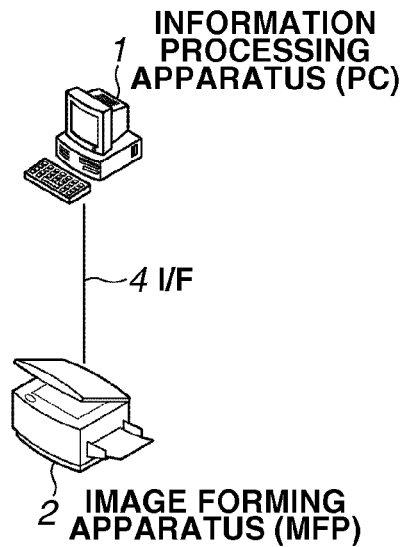
FIG. 1A is a diagram illustrating one example of a configuration of a system.

FIG. 1A is a diagram illustrating one example of a configuration of a system according to the present exemplary embodiment of the present invention.

In the system illustrated in FIG. 1A, an information processing apparatus 1 and an image forming apparatus 2 are communicably connected via an interface (I/F) 4. For example, the information processing apparatus 1 is a general personal computer (PC), and the image forming apparatus 2 is a multifunction peripheral (MFP).

Figure 2A:
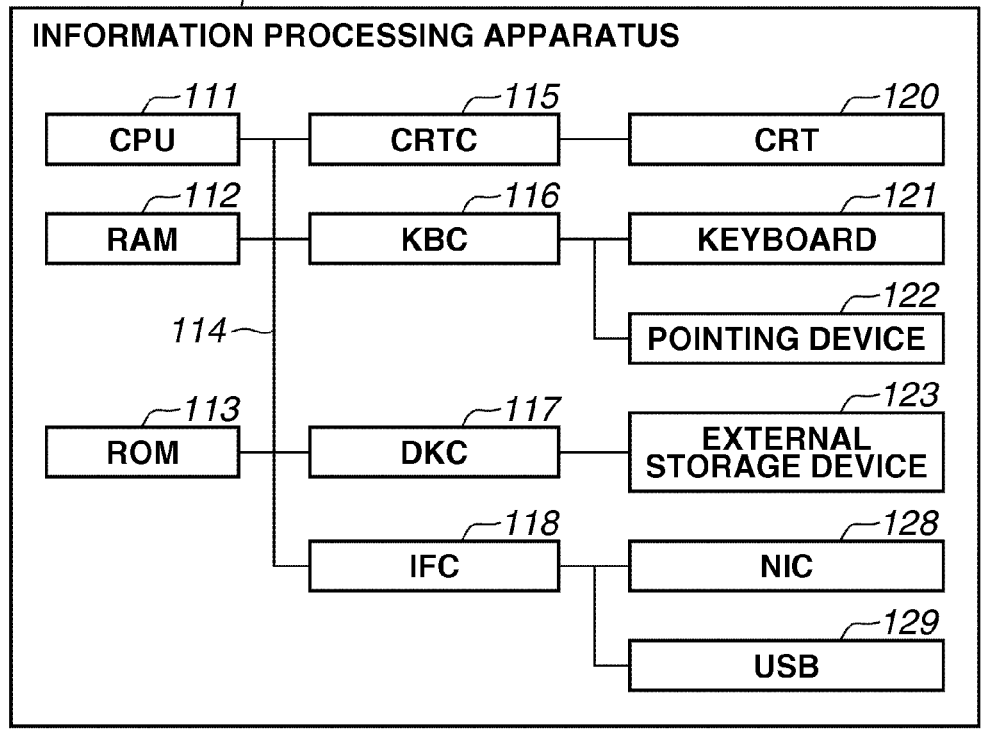
FIG. 2A is a diagram illustrating one example of a hardware configuration of an information processing apparatus.
Figure 2B:
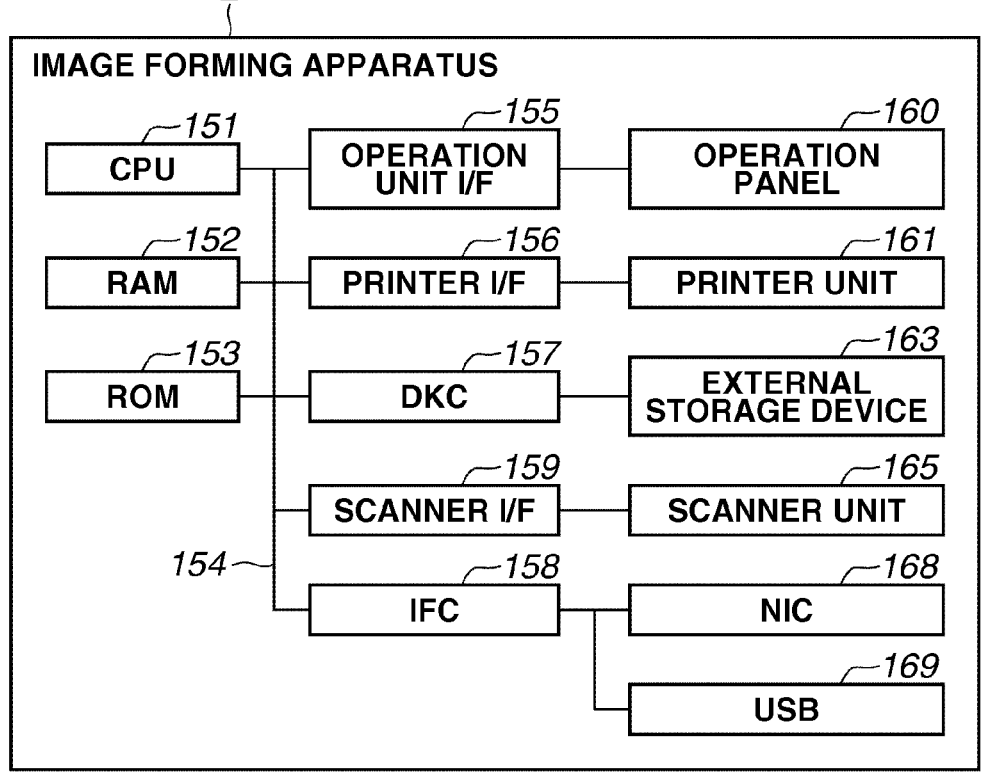
FIG. 2B is a diagram illustrating one example of a hardware configuration of an image forming apparatus.

The general PC serving as the information processing apparatus 1 includes hardware as illustrated in FIG. 2A. The MFP serving as the image forming apparatus 2 includes a color printer, a color facsimile machine, and a color scanner. The image forming apparatus 2 can be a scanner or a digital camera instead of the MFP. The image forming apparatus 2 includes hardware as illustrated in FIG. 2B. The image forming apparatus 2 is communicably connected to the information processing apparatus 1 via the I/F 4, thereby enabling bidirectional communication. The I/F 4 is a connection interface between the information processing apparatus 1 and the image forming apparatus 2. The I/F 4 can be, for example, a network interface such as a local area network (LAN) regardless of wired or wireless, or a local interface such as a universal serial bus (USB).

Figure 1B:
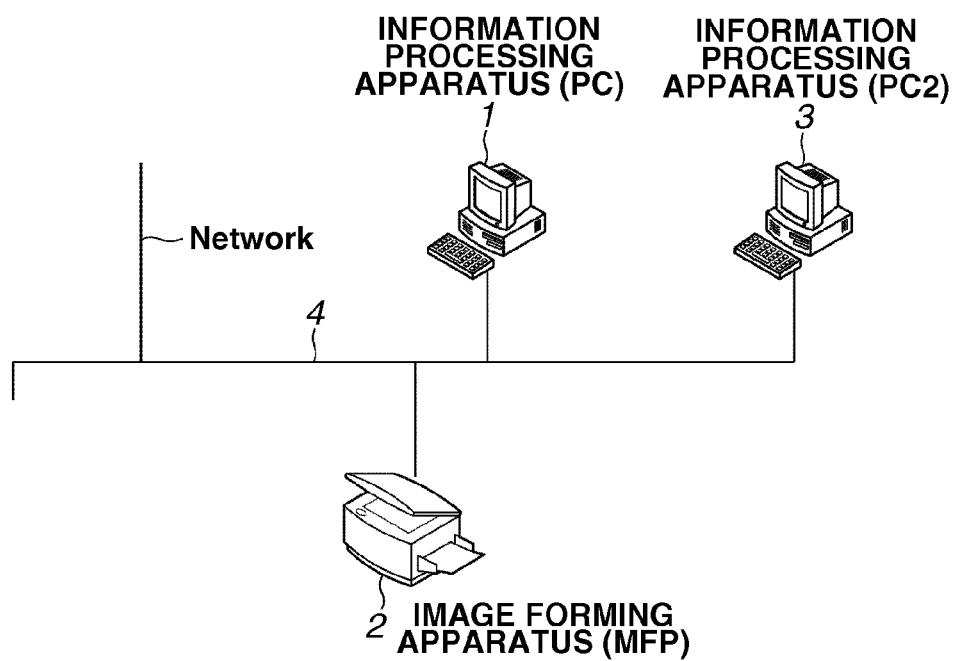
FIG. 1B is a supplemental diagram illustrating the system configuration.

FIG. 1B is a supplemental diagram illustrating the system configuration illustrated in FIG. 1A.

The image forming apparatus 2 is connected to the information processing apparatus 1 and another PC serving as an information processing apparatus 3 via the I/F 4, and is shared. For example, the I/F 4 serving as a network includes Ethernet (trademark). In FIG. 1B, the information processing apparatus 3 is added to the configuration illustrated in FIG. 1A. The image forming apparatus 2 can distinguish between the information processing apparatus 1 and the information processing apparatus 3, and bidirectionally communicate with each of these apparatuses. Consequently, a connection relationship between the information processing apparatus 1 and the image forming apparatus 2 illustrated in FIG. 1B is substantially the same as that illustrated in FIG. 1A.

One example of the system configuration according to the present exemplary embodiment has been described. A hardware configuration according to the present exemplary embodiment will be described below.

(Hardware Configuration)

FIG. 2A is a diagram illustrating one example of a hardware configuration of the information processing apparatus 1.

Although each of the information processing apparatus 1 and the information processing apparatus 3 includes hardware illustrated in FIG. 2A, the hardware configuration illustrated in FIG. 2A is described using the information processing apparatus 1 as an example.

A central processing unit (CPU) 111 comprehensively controls each of devices connected to a system bus 114 according to a program stored in a random access memory (RAM) 112 serving as a storage unit. The RAM 112 also functions as a main memory and a work area of the CPU 111. A read only memory (ROM) 113 stores various programs and data. A keyboard controller (KBC) 116 controls inputs from a keyboard 121 and a pointing device 122 (e.g., a touch panel and a mouse (not illustrated)). A cathode-ray tube controller (CRTC) 115 controls a display to a cathode ray tube (CRT) 120. A disk controller (DKC) 117 controls an access to an external storage device 123 such as a hard disk and a solid state disk (SSD).

The external storage device 123 functions as a storage medium. For example, the information processing apparatus 1 can store a program in the external storage device 123, or read a program from the external storage device 123. The external storage device 123 stores programs including an operating system (OS), a web browser, and an application. The program such as an application and a module (software) stored in the external storage device 123 is read by the RAM 112 as needed and executed by the CPU 111. Accordingly, a function of the application and of each module (software) can be performed.

An interface controller (IFC) 118 is a connection interface to a network interface card (NIC) 128 and a USB 129. The NIC 128 connects the information processing apparatus 1 to a network, whereas the USB 129 connects the information processing apparatus 1 to a peripheral device. The IFC 118 enables the information processing apparatus 1 to be connected to a network and other devices, and controls transmission and reception of data. The hardware configuration is not limited to that illustrated in FIG. 2. The information processing apparatus 1 can include a second network I/F (not illustrated), so that the information processing apparatus 1 can be connected to a network to a radio base station by controlling communications to a mobile network.

The programs including an application may be stored in the RAM 112 or the ROM 113 instead of the external storage device 123.

FIG. 2B is a diagram illustrating one example of a hardware configuration of the image forming apparatus 2.

The MFP serving as the image forming apparatus 2 includes hardware as illustrated in FIG. 2B. A CPU 151 controls the entire operations of the image forming apparatus 2. The CPU 151 comprehensively controls each of devices connected to a system bus 154 according to a program stored in a RAM 152. Moreover, the RAM 152 functions as a main memory and a work area of the CPU 151, and is used as an input information loading area and an environment data storage area. The RAM 152 includes a non-volatile random-access memory (NVRAM) area, and can expand a memory capacity by using an optional RAM to be connected to an expansion port (not illustrated). A ROM 153 stores various fonts, various data, and control programs to be executed by the CPU 151.

An IFC 158 is a connection interface to an NIC 168 and a USB 169. The NIC 168 connects the image forming apparatus 2 to a network, and the USB 169 connects the image forming apparatus 2 to a peripheral device. The IFC 158 enables the image forming apparatus 2 to be connected to a network and other devices, and controls transmission and reception of data to and from the information processing apparatus 1/the information processing apparatus 3.

A printer I/F 156 controls an interface to a printer unit 161 serving as a printer engine. A scanner I/F 159 controls an interface to a scanner unit 165 serving as a scanner engine.

An external storage device 163 is, for example, a hard disk, a flash memory, and an SSD. A DKC 157 controls an access to the external storage device 163. The program stored in the external storage device 163 or the ROM 153 is read by the RAM 152 as needed and executed by the CPU 151, so that a function of the image forming apparatus 2 can be performed. An operation I/F 155 controls an interface to an operation panel 160 used to set various settings of the image forming apparatus 2.

One example of the hardware configuration according to the present exemplary embodiment has been described. A software configuration according to the present exemplary embodiment will be described below.

Software Configuration

Figure 3A:
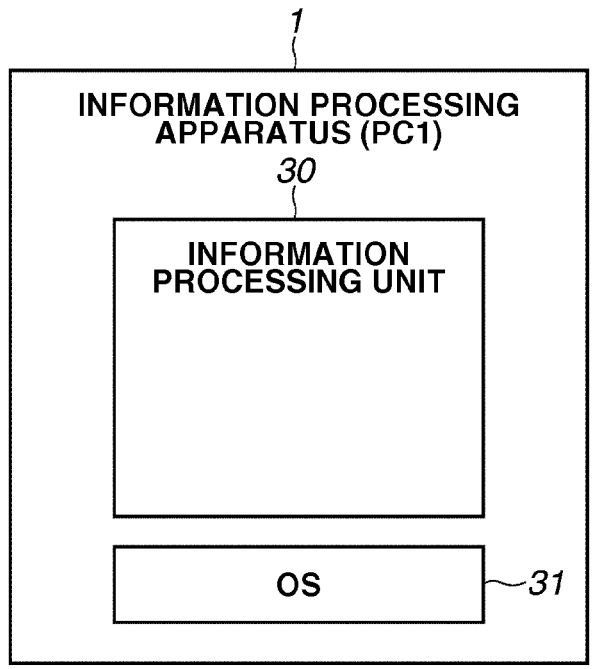
FIG. 3A is a diagram illustrating one example of a software configuration of the information processing apparatus.

FIG. 3A is a diagram illustrating one example of a software configuration of the information processing apparatus 1.

The information processing apparatus 1 includes an information processing unit 30. The information processing unit 30 is loaded to use and control the image forming apparatus 2. The information processing unit 30 is a library used by an executable application/package, or other programs. The information processing unit 30 displays a user interface (UI) on the CRT 120 to receive an input from a keyboard 121, and communicates an image forming unit 32, which will be described below, via the NIC 128. In the information processing apparatus 1, a Windows (trademark) operating system (OS) or a similar OS is installed as an OS 31.

Figure 3B:
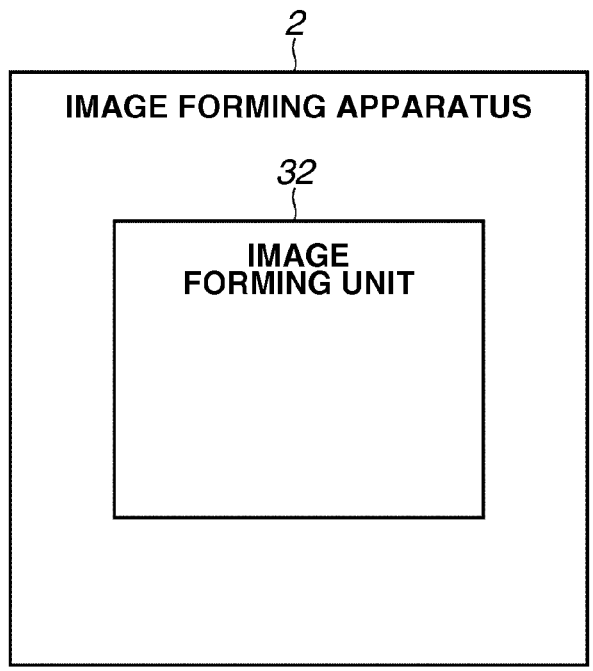
FIG. 3B is a diagram illustrating one example of a software configuration of the image forming apparatus.

FIG. 3B is a diagram illustrating one example of a software configuration of the image forming apparatus 2.

The image forming apparatus 2 includes the image forming unit 32. The image forming unit 32 is loaded to execute and control image forming processing. The image forming unit 32 displays a UI on the operation panel 160, reads an image from the scanner unit 165, and then transmits information and the image to the information processing unit 30 via the NIC 168.

One example of the software configuration according to the present exemplary embodiment has been described with reference to the block diagrams illustrated in FIGS. 3A and 3B. Examples of typical operations of the system will be described below.

(Examples of Typical Operations of System)

Figure 4A:
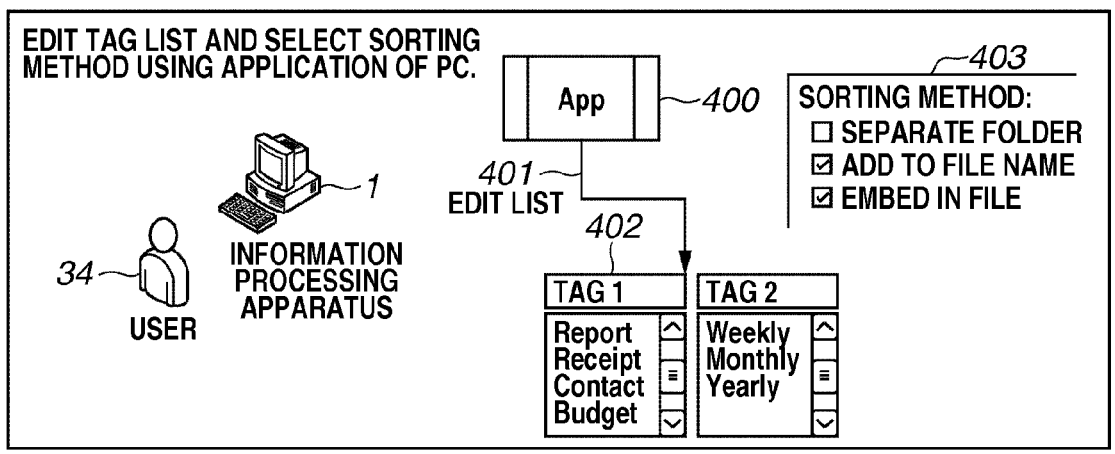
FIG. 4A is a diagram illustrating a case where a sort setting is set.
Figure 4B:
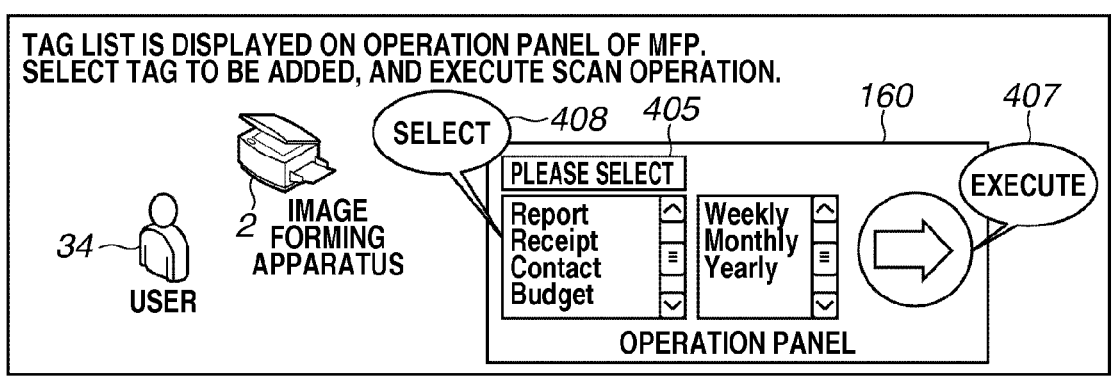
FIG. 4B is a diagram illustrating a case where a scan operation is executed.
Figure 4C:
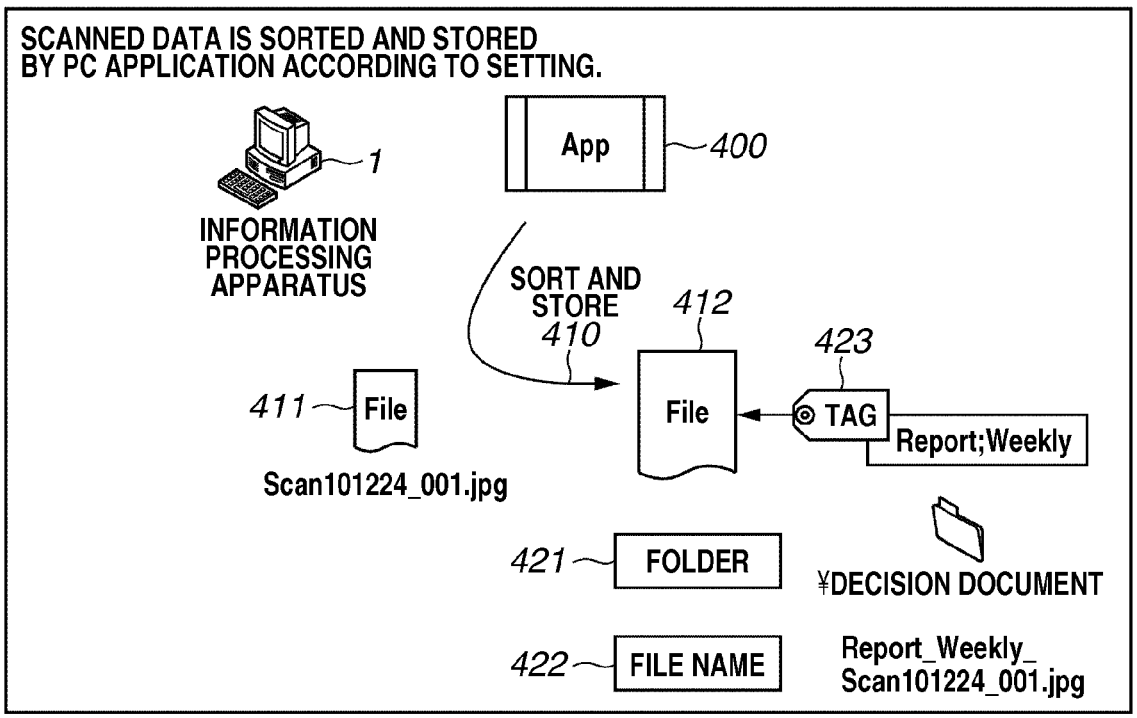
FIG. 4C is a diagram illustrating a case where scanned data is stored.

Referring to FIGS. 4A, 4B, and 4C, examples of typical operations of the system are described.

First, a user 34 sets a sort setting as illustrated in FIG. 4A. The user 34 edits a tag list 402 through an application 400 of the information processing apparatus 1. Such editing is indicated by an arrow 401 illustrated in FIG. 4A. The tag list 402 is information used for a sort operation. In this exemplary diagram, the user 34 inputs a plurality of selection candidates for a document type into a list 1, and a plurality of selection candidates for a period corresponding to the document type into a list 2. The user 34 also sets a sorting method 403. In this exemplary diagram, the user 34 selects addition of tag information to a file name and a file as a sorting method. Accordingly, the user 34 sets the sort setting with the application 400 of the information processing apparatus 1. The list illustrated in FIG. 4A is a mere example.

Next, the user 34 executes a scan operation as illustrated in FIG. 4B. The user 34 operates the operation panel 160 to execute the scan operation using the image forming apparatus 2. On the operation panel 160 of the image forming apparatus 2, a tag list 405 is displayed. A plurality of selection candidates displayed here in the tag list 405 is input beforehand by the user 34 in the tag list 402 illustrated in FIG. 4A. The user 34 selects (408) a tag to be added (used) from the plurality of selection candidates in the tag list 405. Then, the user 34 instructs an execution (407) of the scan operation. In this exemplary diagram, assume that the user 34 selects "Report" and "Weekly" as sorting information from the tag list 405. Accordingly, the user 34 executes the scan operation using the image forming apparatus 2.

Lastly, an operation for storing scanned data is illustrated in FIG. 4C. The application 400 of the information processing apparatus 1 sorts and stores (410) the scanned data according to the setting or the selection. The application 400 receives the tag selected in the selection processing (408) illustrated in FIG. 4B. Generally, the application 400 stores scanned data with a file name including a serial number as a file 411 illustrated in FIG. 4C. Herein, the file name is, for example, date with a serial number. If a sort setting is set, the application 400 sorts and stores the scanned data as a file 412 according to the setting (or selection). That is, the application 400 can apply the selected sorting information (tag) to the setting such as a folder 421, a file name 422, and a tag 423 set by the sorting method. In this exemplary diagram, "Report; Weekly" of the tag 423 is embedded in the scanned data, and "Report_Weekly_" is added to the file name 422 and stored as the file 412.

Hereinafter, the system including these typical operation examples is described.

A UI serving as a setting screen on the information processing apparatus 1 will be briefly described below.

(Display Example of UI Setting Screen of Information Processing Unit)

A UI serving a setting screen on the information processing apparatus 1 is briefly described. Each screen is displayed on the CRT 120 of the information processing apparatus 1 by the information processing unit 30.

Figure 5A:
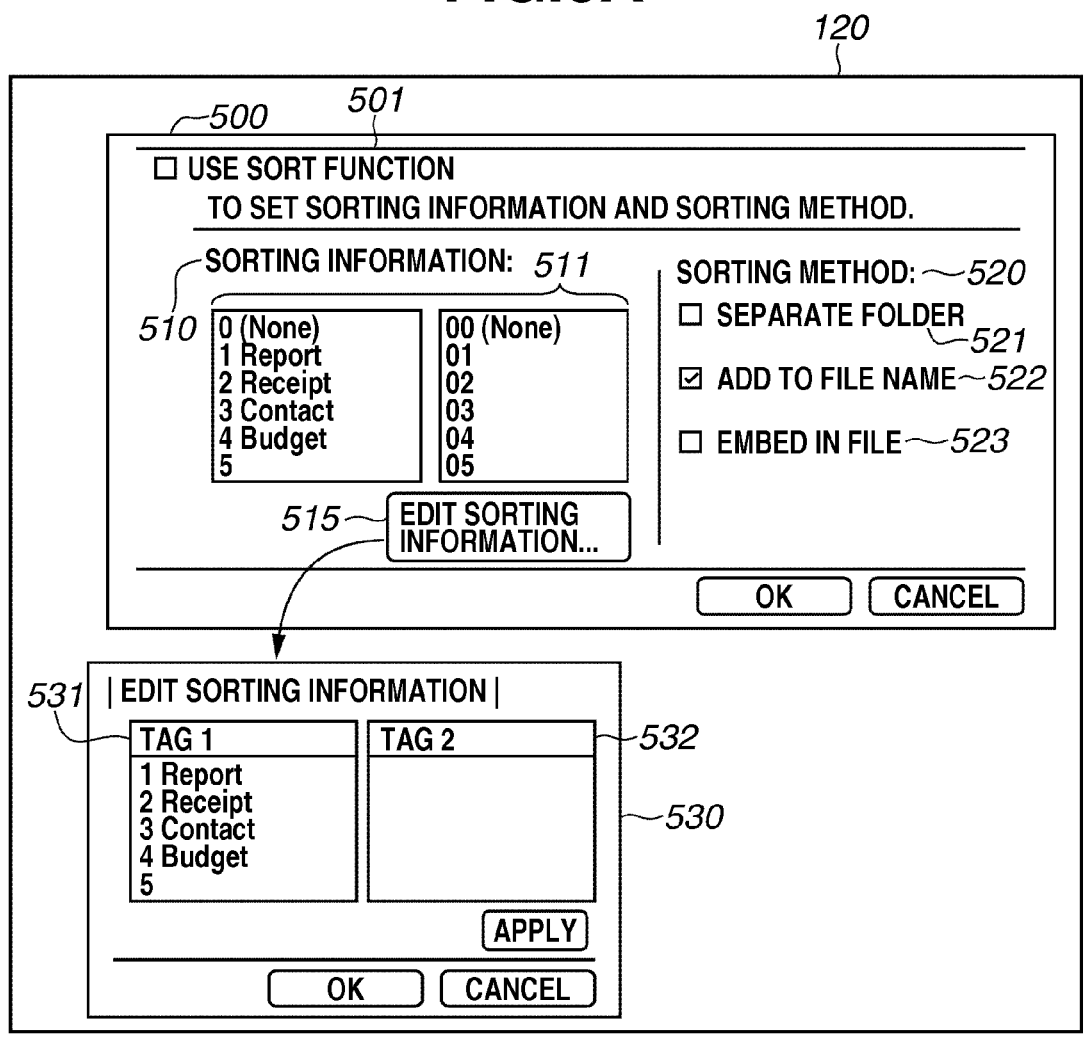
FIG. 5A is a diagram illustrating one example of a scanned data sort setting screen displayed by the information processing unit.

FIG. 5A is a diagram illustrating one example of a scanned data sort setting screen displayed on the CRT 120 by the information processing unit 30. The information processing unit 30 displays a dialog box 500 serving as a sort function setting screen on the CRT 120. On the dialog box "SORT FUNCTION" 500, a check box "USE SORT FUNCTION" 501, a group box "SORTING INFORMATION" 510, and a group box "SORTING METHOD" 520 are arranged.

The check box "USE SORT FUNCTION" 501 serves as an ON/OFF switch of a scanned data sort function. When this switch is ON, an operation of the sort function is added to normal scan processing.

The group box "SORTING INFORMATION" 510 includes a list "SORTING INFORMATION" 511 and a button "EDIT SORTING INFORMATION" 515. The list "SORTING INFORMATION" 511 is a list of information elements (tags) for a sort operation. A user selects a tag that needs to be added for the sort operation from the list "SORTING INFORMATION" 511. For example, if the list "SORTING INFORMATION" 511 includes two lists, and selection of one tag per list is permitted, the user can select two tags. When the user presses the button "EDIT SORTING INFORMATION" 515, a dialog "EDIT SORTING INFORMATION" 530 is displayed. On the dialog "EDIT SORTING INFORMATION" 530, a list "Tag 1" 531 and a list "Tag 2" 532 are provided. The user edits a tag list using the list "Tag 1" 531 and the list "Tag 2" 532. An editing result in the dialog "EDIT SORTING INFORMATION" 530 is applied to the list "SORTING INFORMATION" 511. In the present exemplary embodiment, the tag is described as a character string object. However, a tag can be an object generated in a different format.

The group box "SORTING METHOD" 520 includes a check box "SEPARATE FOLDER" 521, a check box "ADD TO FILE NAME" 522, and a check box "EMBED IN FILE" 523. The user can select a sorting method for the scanned data using these three check boxes in the group box "SORTING METHOD" 520. If the check box "SEPARATE FOLDER" 521 is ON, a storage destination of the scanned data is switched according to the selected tag. If the check box "ADD TO FILE NAME" 522 is ON, a file name of the scanned data is changed according to the selected tag. If the check box "EMBED IN FILE" 523 is ON, a tag is added to the scanned data according to the selected tag.

Figure 5B:
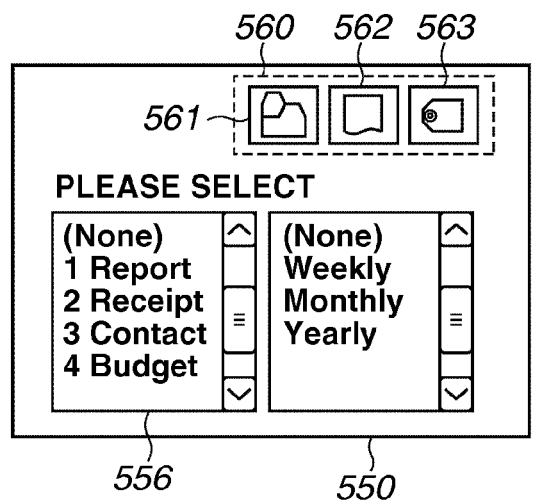
FIG. 5B is a diagram illustrating one example of a scanned data sort setting screen displayed by the information processing unit.

FIG. 5B is a diagram illustrating one example of a scanned data sort setting screen displayed by the information processing unit 30. If a scan operation is being executed, the information processing unit 30 displays a dialog box 550 serving as a sort function setting screen. The dialog box 500 is used when a detailed setting including an initial value is set. On the other hand, the dialog box 550 is used when a simple setting is set. The simple setting includes a change in selection. The user selects the sorting information from a list 556. The user can refer to the sorting method using an icon row 560. An icon 561 displays a setting state of the check box "SEPARATE FOLDER" 521. An icon 562 displays a setting state of the check box "ADD TO FILE NAME" 522. An icon 563 displays a setting state of the check box "EMBED IN FILE" 523. The icon row 560 is used to refer to the setting states. However, the icon row 560 may display ON/OFF and receive ON/OFF to change a setting of the sorting method.

Figure 5C:
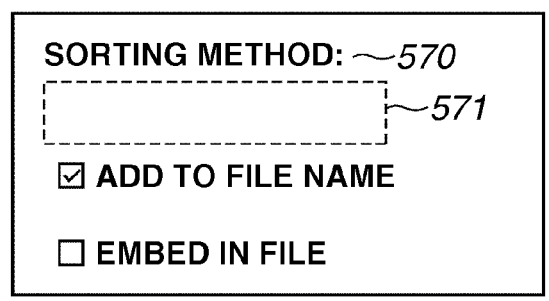
FIG. 5C is a diagram illustrating one example of a display of a sorting method group box.

FIG. 5C is a diagram illustrating one example display of a sorting method group box 570. The sorting method group box 570 is displayed when a new folder cannot be generated in a storage destination of the scanned data due to authorization. If the information processing unit 30 determines that a storage destination folder for the scanned data cannot be switched according to the selected tag, the check box "SEPARATE FOLDER" is not displayed as a box 571.

The UI and the setting screens on the information processing apparatus 1 have been briefly described. A UI (a selection screen) on the image forming apparatus 2 will be described below.

(UI Selection Screen Example of Image Forming Unit)

Figure 6:
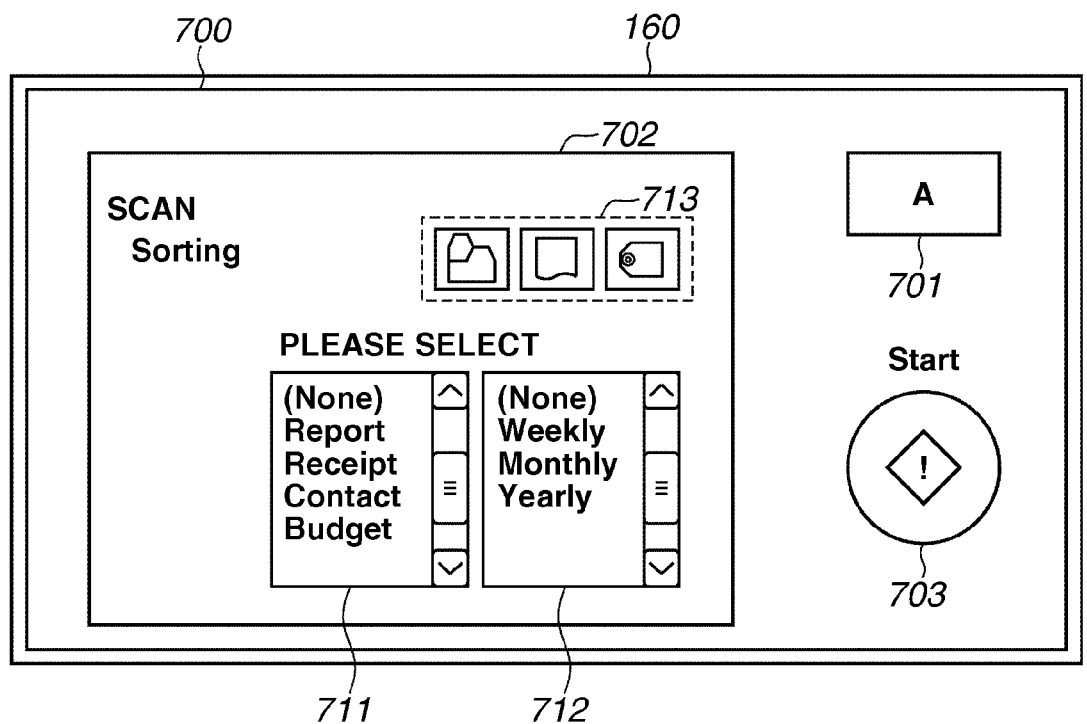
FIG. 6 is a diagram illustrating one example of a user interface (UI) on the image forming apparatus.

A UI (selection screen) on the image forming apparatus 2 is briefly described with reference to FIG. 6. The image forming unit 32 displays and controls a screen 700 on the operation panel 160 of the image forming apparatus 2.

The image forming unit 32 displays a sort setting screen 702 when a key "A" 701 is pressed during a scan operation, for example. On the sort setting screen 702, sorting information is displayed on a list 711 and a list 712. Such sorting information is a content edited and set by the information processing apparatus 1. The user can refer to a sorting method using an icon row 713 on the sort setting screen 702. The icon row 713 displays setting states of the check boxes "SEPARATE FOLDER", "ADD TO FILE NAME", and "EMBED IN FILE" of the information processing apparatus 1. Herein, the icon row 713 is described to refer to the setting states. However, the icon row 713 may display ON/OFF and receive ON/OFF to change a setting of the sorting method.

Accordingly, the user selects a tag from the lists 711 and 712 on the sort setting screen 702. When the user presses a start button 703, the scan operation begins.

The UI (selection screen) on the image forming apparatus 2 has been briefly described. The information processing unit 30 and the image forming unit 32 of the system will be described below with reference to a sequence diagram.

(Sequence of Information Exchanges Between Information Processing Unit and Image Forming Unit)

Figure 7:
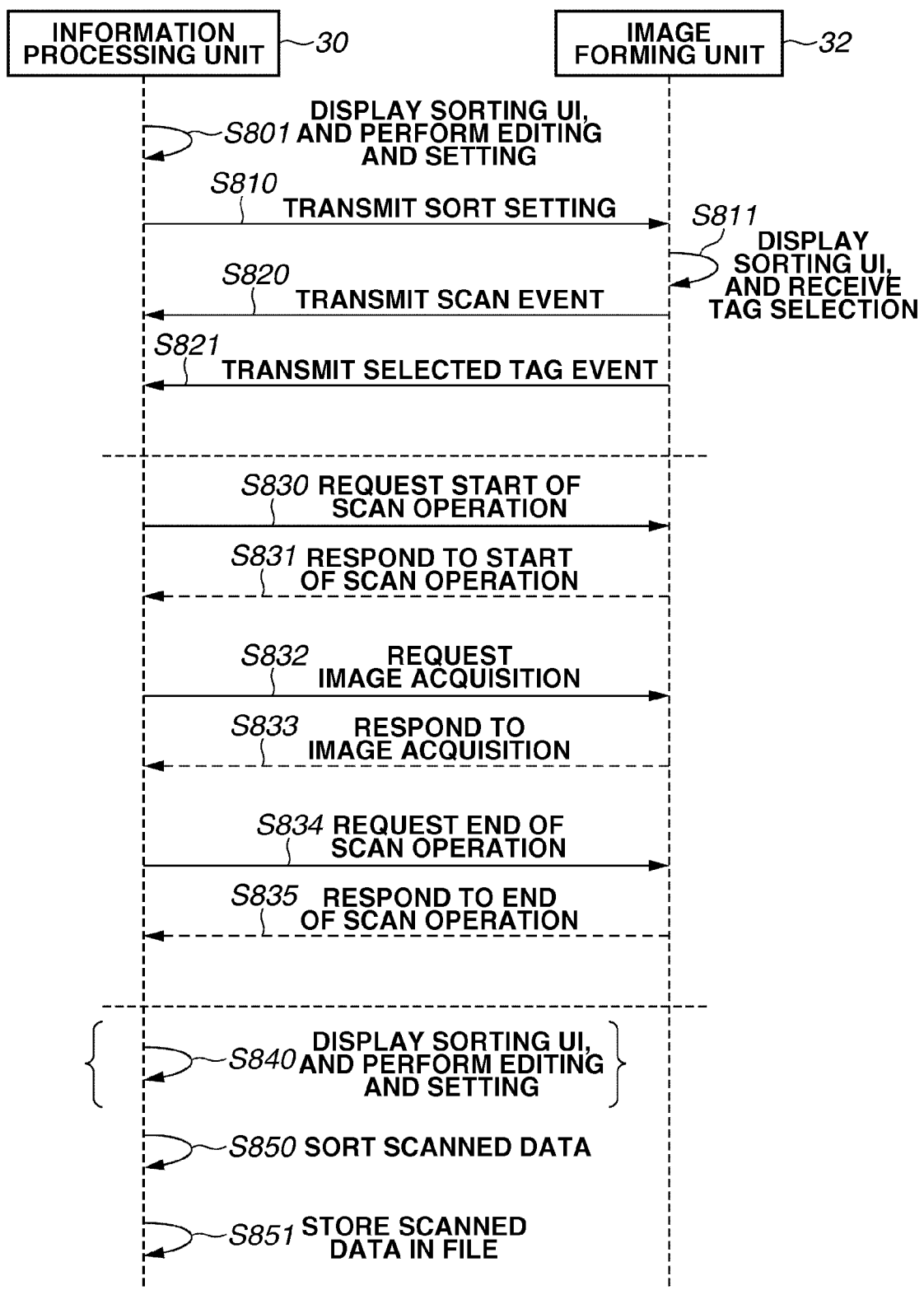
FIG. 7 is a sequence diagram illustrating one example of information exchanges between an information processing unit and an image forming unit.

FIG. 7 is a sequence diagram illustrating one example of information exchanges between the information processing unit 30 and the image forming unit 32.

First, the information processing unit 30 displays a UI, and transmits a sort setting to the image forming unit 32.

That is, in step S801, the information processing unit 30 displays a sorting UI to cause a user to operate the sorting UI, so that the information processing unit 30 performs editing and setting based on the editing and setting operations performed by the user. For example, the information processing unit 30 displays the sorting UI (the sort setting screen) as illustrated in FIG. 5A.

Next, in step S810, the information processing unit 30 transmits the sort setting (a list of sorting information) set by the user via the UI as illustrated in FIG. 5A (list transmission).

Then, in the image forming apparatus 2, a scan operation is instructed by the user, and the image forming unit 32 displays a UI. When the user presses a start button, the image forming unit 32 executes the scan operation, and transmits a result of the scan operation and the sorting information selected from the UI to the information processing unit 30.

That is, in step S811, the image forming unit 32 displays the sorting UI based on the received sort setting, and receives a tag selection. For example, the image forming unit 32 displays the screen as illustrated in FIG. 6.

When the user selects the tag and presses the start button, the image forming unit 32 performs the following processing.

That is, in step S820, the image forming unit 32 transmits a scan event.

In step S821, the image forming unit 32 transmits a selected tag event. For example, the image forming unit 32 transmits information (sorting information) of the tag selected on the UI illustrated in FIG. 6 to the information processing unit 30 (transmission of the sorting information). The information processing unit 30 receives the tag information (sorting information) transmitted from the image forming unit 32 (receipt of the sorting information).

Subsequently, processing relating to the scan operation is performed. The scanned data is transmitted and received between the information processing unit 30 and the image forming unit 32.

In step S830, the information processing unit 30 requests the start of the scan operation.

In step S831, the image forming unit 32 responds to the start of the scan operation.

In step S832, the information processing unit 30 requests image acquisition.

In step S833, the image forming unit 32 responds to the image acquisition (transmission of the scanned data). The information processing unit 30 receives the scanned data transmitted from the image forming unit 32 (receipt of the scanned data).

In step S834, the information processing unit 30 requests the end of the scan operation.

In step S835, the image forming unit 32 responds to the end of the scan operation.

In a case where the sort setting is updated in the information processing unit 30, the user needs to request a re-display of the UI and update the sort setting.

That is, in step S840, the information processing unit 30 displays the sorting UI again, and performs editing and setting again based on the editing and setting operations performed by the user.

Lastly, the scanned data is sorted and stored by the information processing unit 30.

That is, in step S850, the information processing unit 30 sorts the scanned data. In step S851, the information processing unit 30 stores the scanned data in a file.

The sequence of information exchanges between the information processing unit 30 and the image forming unit 32 has been described. A detailed description of each sequence step will be described below with reference to a flowchart after one example of a data structure of the system is described.

(Example of Data Structure)

Figure 8:
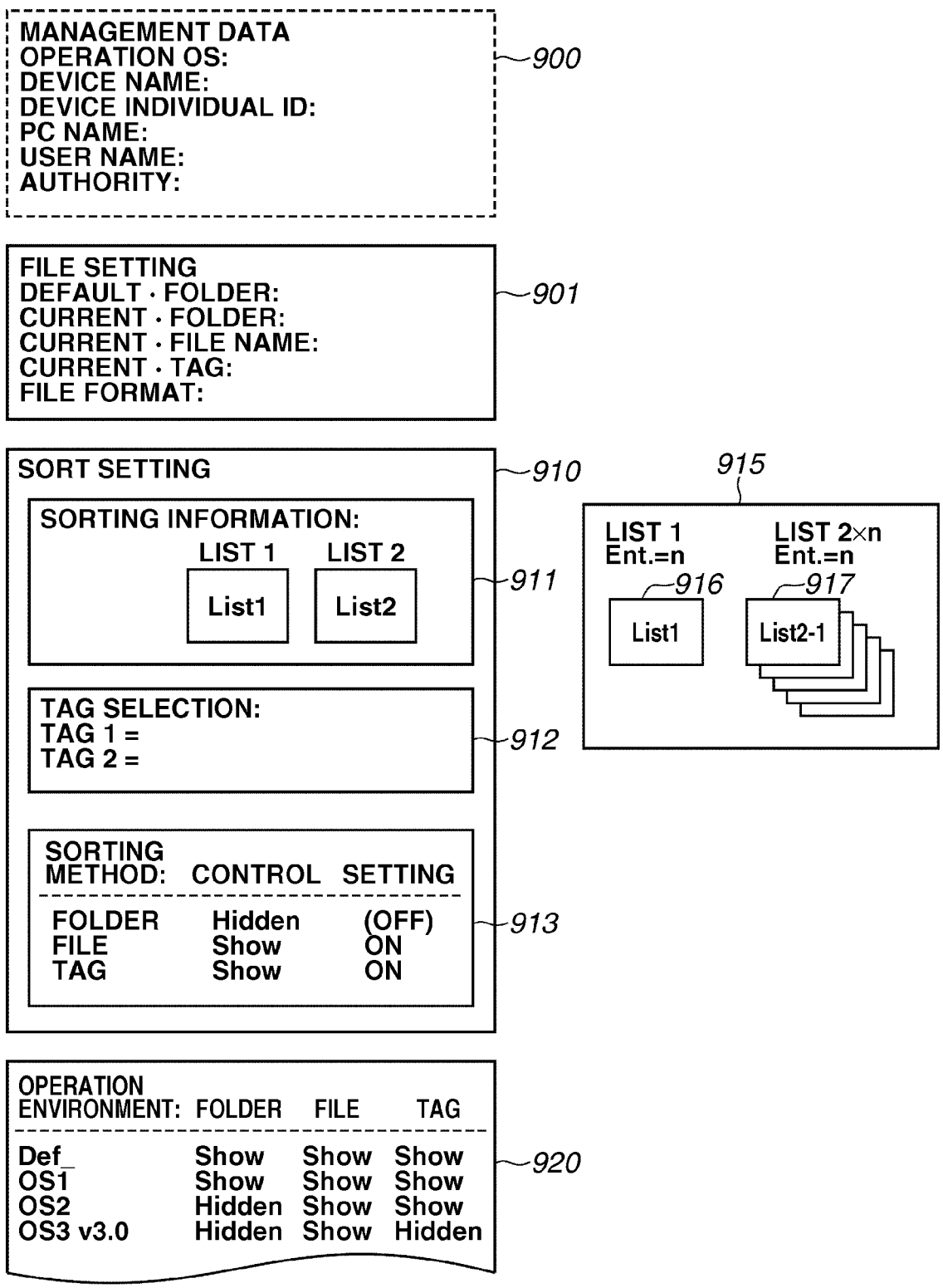
FIG. 8 is a diagram illustrating an example of a data structure of the system.

FIG. 8 is a diagram illustrating an example of a data structure of the system.

A structure of each data or field is briefly described using the information processing unit 30 as an example. The description includes a structure of the data transmitted and received between the image forming unit 32 and the information processing unit 30. A detailed description of each of the data will be provided below with reference to a flowchart.

Management data 900 is used to manage operations of the information processing unit 30. In this management data 900, information about the information processing apparatus 1, the OS 31, and the image forming apparatus 2 is recorded. A field "DEVICE NAME:", and a field "DEVICE INDIVIDUAL ID:" are information about the image forming apparatus 2. The image forming apparatus 2 has identification (ID) such as a media access control (MAC) address of the NIC 168 and a serial ID of the USB 169, an ID identifying an individual. Therefore, the information processing unit 30 manages the information of each individual by using the field "DEVICE INDIVIDUAL ID:" in addition to the connection information of the image forming apparatus 2.

Each of the fields "OPERATION OS:", "PC NAME:", "USER NAME:", and "AUTHORITY:" is information about the OS 31 of the information processing apparatus 1. For example, when folder processing or file processing is performed with the OS 31, the information processing unit 30 uses the information of "OPERATION OS:", "USER NAME", and "AUTHORITY".

File setting data 901 is setting data of file storage of the information processing unit 30. The file setting data 901 has fields including "DEFAULT•FOLDER:", "CURRENT•FOLDER:", "CURRENT•FILE NAME:", "CURRENT•TAG", and "FILE FORMAT:".

Sort setting data 910 is a sort setting data example of the information processing unit 30. The sort setting data 910 has data including "SORTING INFORMATION:" 911, "TAG SELECTION:" 912, and "SORTING METHOD:" 913.

The data "SORTING INFORMATION:" 911 is a list of tags (information elements) to be used for a sort operation. The "SORTING INFORMATION:" 911 includes two lists which are a list 1 and a list 2. However, the number of lists is not limited to two.

The data "TAG SELECTION:" 912 retains a selected tag, and has two fields of tag 1 and tag 2. The tags selected from the list 1 and the list 2 of the data "SORTING INFORMATION:" 911 are retained in the tag 1 and the tag 2.

The data "SORTING METHOD:" 913 is a sorting method setting table. In the data "SORTING METHOD:" 913, validity/invalidity of control and setting thereof is recorded for each setting method with respect to a folder, a file, and a tag. In a control column, validity/invalidity of the control is indicated by a state of Show or Hidden. In a setting column, ON or OFF of the setting is recorded.

Herein, sorting information 915 is described as another example of the data "SORTING INFORMATION:" 911. The sorting information 915 is a list of tags (information elements), and has roughly two lists of a list 1 and a list 2 as similar to the data "SORTING INFORMATION:" 911. However, the sorting information 915 includes one list 1 (916) and a plurality of lists 2 (917). The sorting information 915 is suitable when a tag to be listed as the lists 2 is switched according to tag selection in the list 1. For example, if there are five entries in the list 1 (916), the lists 2 (917) have maximum of five lists. An entry 1 of the list 1 (916) should correspond to a list 2-1 among the plurality of lists 2 (917).

Each of the sort setting data 910 and 915 is transmitted to and received from the image forming unit 32. Therefore, the image forming unit 32 handles the sort setting according to the present exemplary embodiment, or in a format according to the present exemplary embodiment.

An operation environment table 920 indicates a relationship between an operation environment and a sorting method. For each operation environment, validity/invalidity of each sorting method with respect to a folder, a file and a tag is stated. A value of the table is indicated by a state of Show or Hidden as similar to that of the control column described above.

The data structure example of the information processing unit 30 has been described. Examples of processing performed by the information processing unit 30 and the image forming unit 32 will be described below with reference to flowcharts. First, an operation environment check performed by the information processing unit 30 will be described with reference to the flowchart.

(Operation Environment Check Processing by Information Processing Unit)

Figure 9:
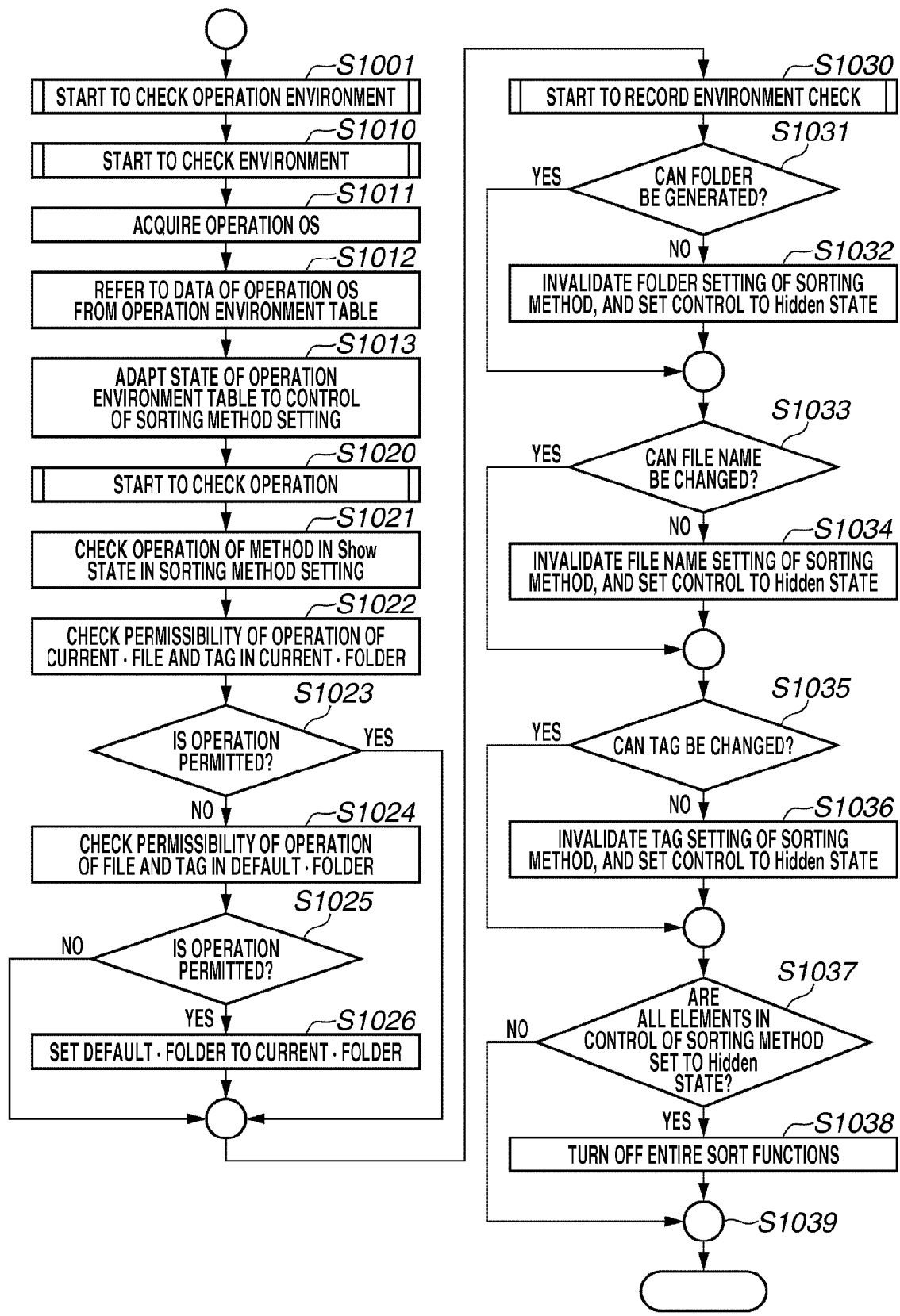
FIG. 9 is a flowchart illustrating one example of operation environment check processing performed by the information processing unit.

FIG. 9 is a flowchart illustrating one example of operation environment check processing performed by the information processing unit 30. Each step in the flowchart illustrated in FIG. 9 is performed by controlling and executing a function of the information processing unit 30 serving as software stored in a storage unit such as the ROM 113 and the external storage device 123 of the information processing apparatus 1 by the CPU 111.

In step S1001, the information processing unit 30 starts to check an operation environment.

In step S1010, the information processing unit 30 starts to check an environment.

In step S1011, the information processing unit 30 acquires an operation OS.

In step S1012, the information processing unit 30 refers to data of the operation OS from an operation environment table.

In step S1013, the information processing unit 30 adapts a state of the operation environment table to a control of a sorting method setting.

In step S1020, the information processing unit 30 starts to check an operation.

In step S1021, the information processing unit 30 checks an operation of the sorting method in a Show state in the sorting method setting.

In step S1022, the information processing unit 30 checks permissibility of an operation of a current•file and a tag in a current•folder.

In step S1023, the information processing unit 30 determines whether the operation in the current•folder is permitted. If the operation in the current•folder is permitted (YES in step S1023), the operation proceeds to step S1030. If the operation in the current•folder is not permitted (NO in step S1023), the operation proceeds to step S1024.

In step S1024, the information processing unit 30 checks permissibility of an operation of the file and the tag in a default•folder.

In step S1025, the information processing unit 30 determines whether the operation to the default•folder is permitted. If the operation to the default•folder is permitted (YES in step S1025), the operation proceeds to step S1026. If the operation to the default•folder is not permitted (NO in step S1025), the operation proceeds to step S1030.

In step S1026, the information processing unit 30 sets the default•folder to the current•folder.

In step S1030, the information processing unit 30 starts to record the environment check.

In step S1031, the information processing unit 30 determines whether a folder can be generated. If the folder cannot be generated (NO in step S1031), the operation proceeds to step S1032. If the folder can be generated (YES in step S1031), the operation proceeds to step S1033.

In step S1032, the information processing unit 30 invalidates the folder setting of the sorting method, and sets the control to a Hidden state.

In step S1033, the information processing unit 30 determines whether a file name can be changed. If the information processing unit 30 determines that the file name cannot be changed (NO in step S1033), the operation proceeds to step S1034. If the file name can be changed (YES in step S1033), the operation proceeds to step S1035.

In step S1034, the information processing unit 30 invalidates the file name setting of the sorting method, and sets the control to a Hidden state.

In step S1035, the information processing unit 30 determines whether a tag can be changed. If the information processing unit 30 determines that the tag cannot be changed (NO in step S1035), the operation proceeds to step S1036. If the tag can be changed (YES in step S1035), the operation proceeds to step S1037.

In step S1036, the information processing unit 30 invalidates the tag setting of the sorting method, and sets the control to a Hidden state.

In step S1037, the information processing unit 30 determines whether all the elements in the control of the sorting method are set to the Hidden states. If the information processing unit 30 determines that all the elements in the control of the sorting method are set to the Hidden states (YES in step S1037), the operation proceeds to step S1038. If not all the elements in the control of the sorting method are set to the Hidden states (NO in step S1037), the operation proceeds to step S1039.

In step S1038, the information processing unit 30 turns off the entire sort functions.

The operation environment check performed by the information processing unit 30 has been described with reference to the flowchart illustrated in FIG. 9. The information processing unit 30 checks the operation environment thereof, and adjusts a range of the sort function. UI setting processing performed by the information processing unit 30 will be described below with reference to a flowchart. The information processing unit 30 performs the UI setting processing in response to a result of the operation environment check. (UI setting processing by information processing unit)

Figure 10:
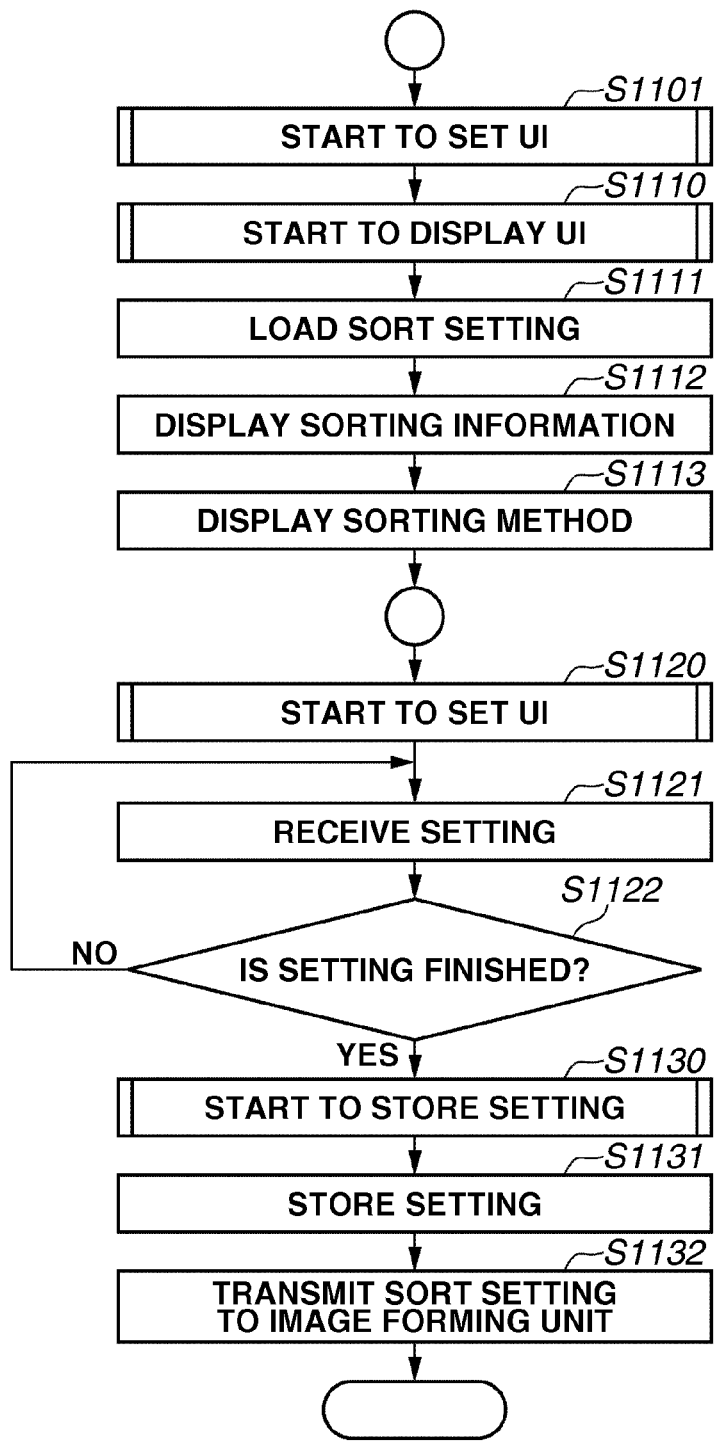
FIG. 10 is a flowchart illustrating one example of UI setting processing performed by the information processing unit.

FIG. 10 is a flowchart illustrating one example of UI setting processing performed by the information processing unit 30. Each step in the flowchart illustrated in FIG. 10 is performed by controlling and executing a function of the information processing unit 30 serving as software stored in a storage unit such as the ROM 113 and the external storage device 123 of the information processing apparatus 1 by the CPU 111.

In step S1101, the information processing unit 30 starts to set a UI.

In step S1110, the information processing unit 30 starts to displays the UI.

In step S1111, the information processing unit 30 loads a sort setting.

In step S1112, the information processing unit 30 displays sorting information.

In step S1113, the information processing unit 30 displays a sorting method.

In step S1120, the information processing unit 30 starts to set a UI.

In step S1121, the information processing unit 30 receives a setting.

In step S1122, the information processing unit 30 determines whether the setting is finished. If the information processing unit 30 determines that the setting is finished (YES in step S1122), the operation proceeds to step S1130. If the setting is not finished (NO in step S1122), the operation returns to step S1121.

In step S1130, the information processing unit 30 starts to store the setting.

In step S1131, the information processing unit 30 stores the setting.

In step S1132, the information processing unit 30 transmits the sort setting to the image forming unit 32.

The UI setting processing performed by the information processing unit 30 has been described with reference to the flowchart illustrated in FIG. 10. The information processing unit 30 sets the UI, stores such UI setting, and transmits the UI setting to the image forming unit 32. Event processing performed by the information processing unit 30 will be described below with reference to a flowchart, followed by a description of processing performed by the image forming unit 32.

(Event Processing by Information Processing Unit)

Figure 11:
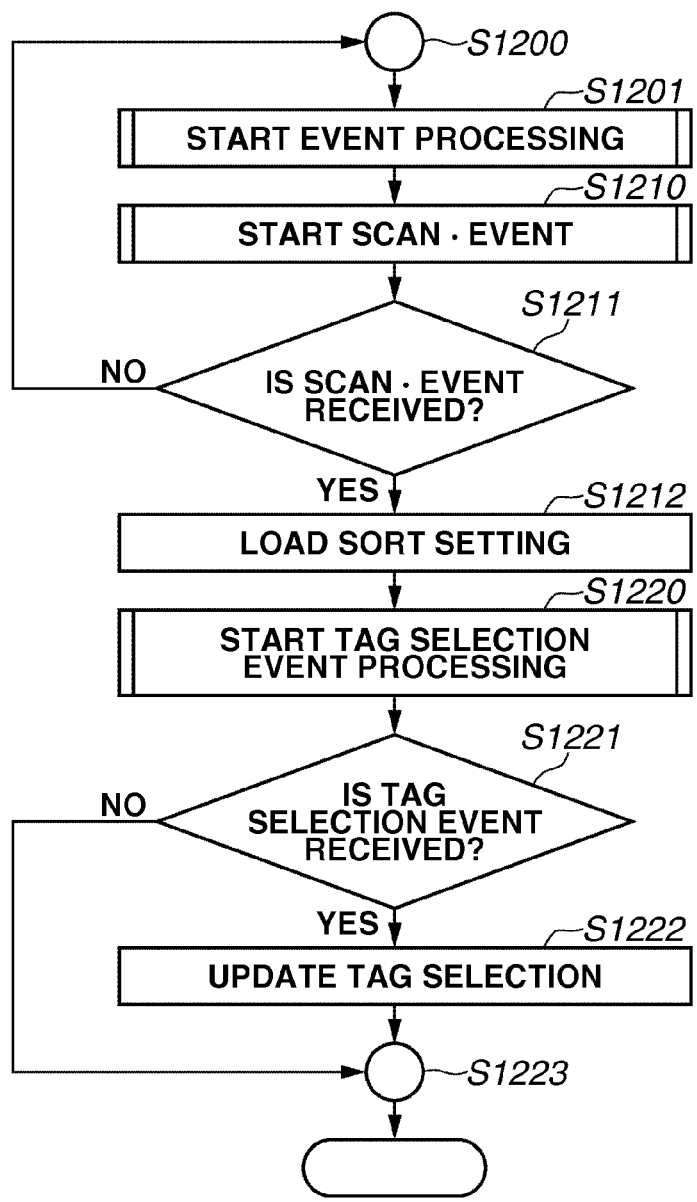
FIG. 11 is a flowchart illustrating one example of event processing performed by the information processing unit.

FIG. 11 is a flowchart illustrating one example of event processing performed by the information processing unit 30. Each step in the flowchart illustrated in FIG. 11 is performed by controlling and executing a function of the information processing unit 30 serving as software stored in a storage unit such as the ROM 113 and the external storage device 123 of the information processing apparatus 1 by the CPU 111.

In step S1201, the information processing unit 30 starts event processing.

In step S1210, the information processing unit 30 starts a scan•event.

In step S1211, the information processing unit 30 determines whether the scan•event is received. If the information processing unit 30 determines that the scan•event is received (YES in step S1211), the operation proceeds to step S1212. If the scan•event is not received (NO in step S1211), the operation returns to step S1200.

In step S1212, the information processing unit 30 loads a sort setting.

In step S1220, the information processing unit 30 starts tag selection event processing. In step S1221, the information processing unit 30 determines whether a tag selection event is received. If the information processing unit 30 determines that the tag selection event is received (YES in step S1221), the operation proceeds to step S1222. If the tag selection event is not received (NO in step S1221), the operation proceeds to step S1223.

In step S1222, the information processing unit 30 updates the tag selection.

The event processing performed by the information processing unit 30 has been described. Event processing and UI setting processing performed by the image forming unit 32 will be described below with reference to a flowchart.

(Event Processing and UI Setting Processing by Image Forming Unit)

Figure 12:
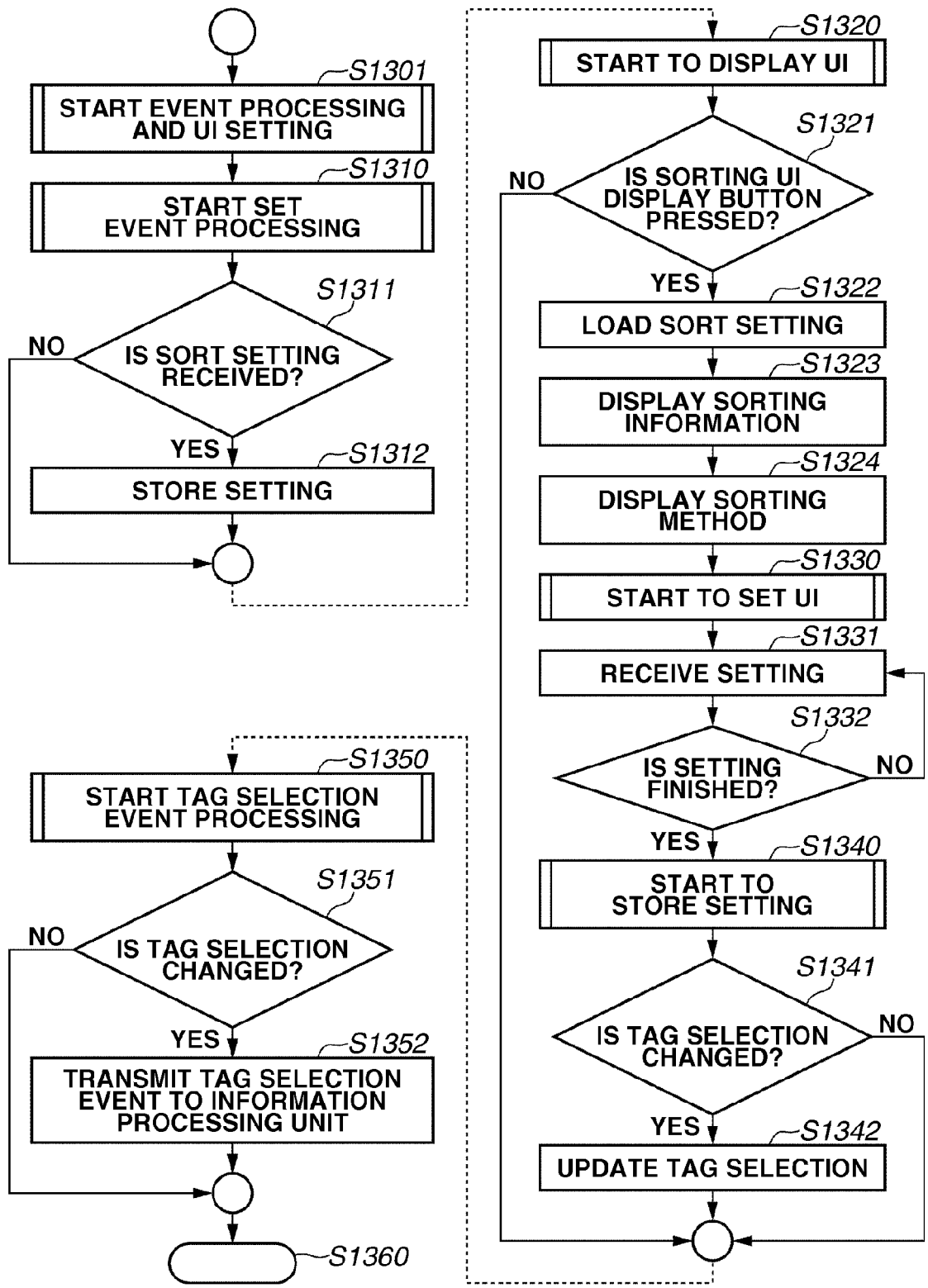
FIG. 12 is a flowchart illustrating one example of event processing and UI setting processing performed by the image forming unit.

FIG. 12 is a flowchart illustrating one example of event processing and UI setting processing performed by the image forming unit 32. Each step in the flowchart illustrated in FIG. 12 is performed by controlling and executing a function of the image processing unit 32 serving as software stored in a storage unit such as the ROM 153 and the external storage device 163 of the image forming apparatus 2 by the CPU 151.

In step S1301, the image forming unit 32 starts event processing and UI setting processing.

In step S1310, the image forming unit 32 starts set event processing.

In step S1311, the image forming unit 32 determines whether a sort setting is received. If the image forming unit 32 determines that the sort setting is received (YES in step S1311), the operation proceeds to step S1312. If the sort setting is not received (NO in step S1311), the operation proceeds to step S1320.

In step S1312, the image forming unit 32 stores the setting.

In step S1320, the image forming unit 32 starts to display a UI.

In step S1321, the image forming unit 32 determines whether a sorting UI display button is pressed. If the image forming unit 32 determines that the sorting UI display button is pressed (YES in step S1321), the operation proceeds to step S1322. If the sorting UI display button is not pressed (NO in step S1321), the operation proceeds to step S1350.

In step S1322, the image forming unit 32 loads the sort setting.

In step S1323, the image forming unit 32 displays sorting information.

In step S1324, the image forming unit 32 displays a sorting method.

In step S1330, the image forming unit 32 starts to set a UI.

In step S1331, the image forming unit 32 receives a setting.

In step S1332, the image forming unit 32 determines whether the setting is finished. If the image forming unit 32 determines that the setting is finished (YES in step S1332), the operation proceeds to step S1340. If the setting is not finished (NO in step S1332), the operation returns to step S1331.

In step S1340, the image forming unit 32 starts to store the setting.

In step S1341, the image forming unit 32 determines whether the tag selection is changed. If the image forming unit 32 determines that the tag selection is changed (YES in step S1341), the operation proceeds to step S1342. If the tag selection is not changed (NO in step S1341), the operation proceeds to step S1350.

In step S1342, the image forming unit 32 updates the tag selection.

In step S1350, the image forming unit 32 starts tag selection event processing. In step S1351, the image forming unit 32 determines whether the tag selection is changed. If the tag selection is changed (YES in step S1351), the operation proceeds to step S1352. If the tag selection is not changed (NO in step S1351), the operation proceeds to step S1360.

In step S1352, the image forming unit 32 transmits the tag selection event to the information processing unit 30.

Now, a supplemental description of the flowchart illustrated in FIG. 12 is given.

In the flowchart illustrated in FIG. 12, the exemplary processing in which the sorting information is selected using the UI of the image forming unit 32 has been described. The image forming unit 32 transmits the tag selection event to the information processing unit 30 (step S1352). Accordingly, the user can set the entire sort settings using the UI of the image forming unit 32. In such a case, for example, the image forming unit 32 can transmit the sort setting to the information processing unit 30 as a response to the set event of step S1310.

The event processing and the UI setting processing performed by the image forming unit 32 have been described with reference to the flowchart. Sort processing performed by the information processing unit 30 will be described below with reference to a flowchart.

(Sort Processing by Information Processing Unit)

Figure 13:
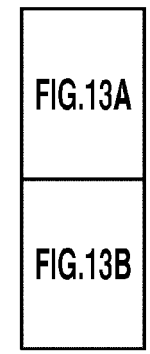
FIG. 13, composed of FIG. 13A and FIG. 13B, is a flowchart illustrating one example of sort processing performed by the information processing unit.
Figure 13A:
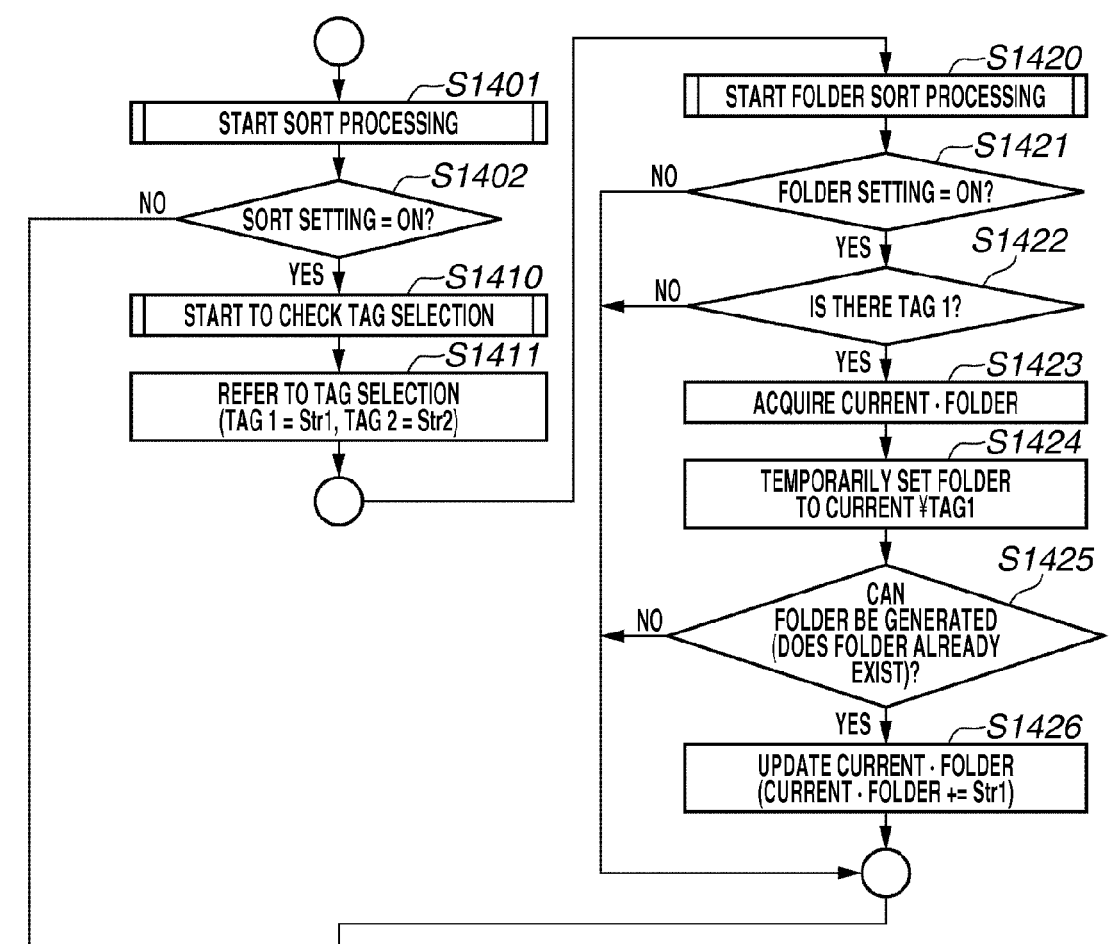
Figure 13B:
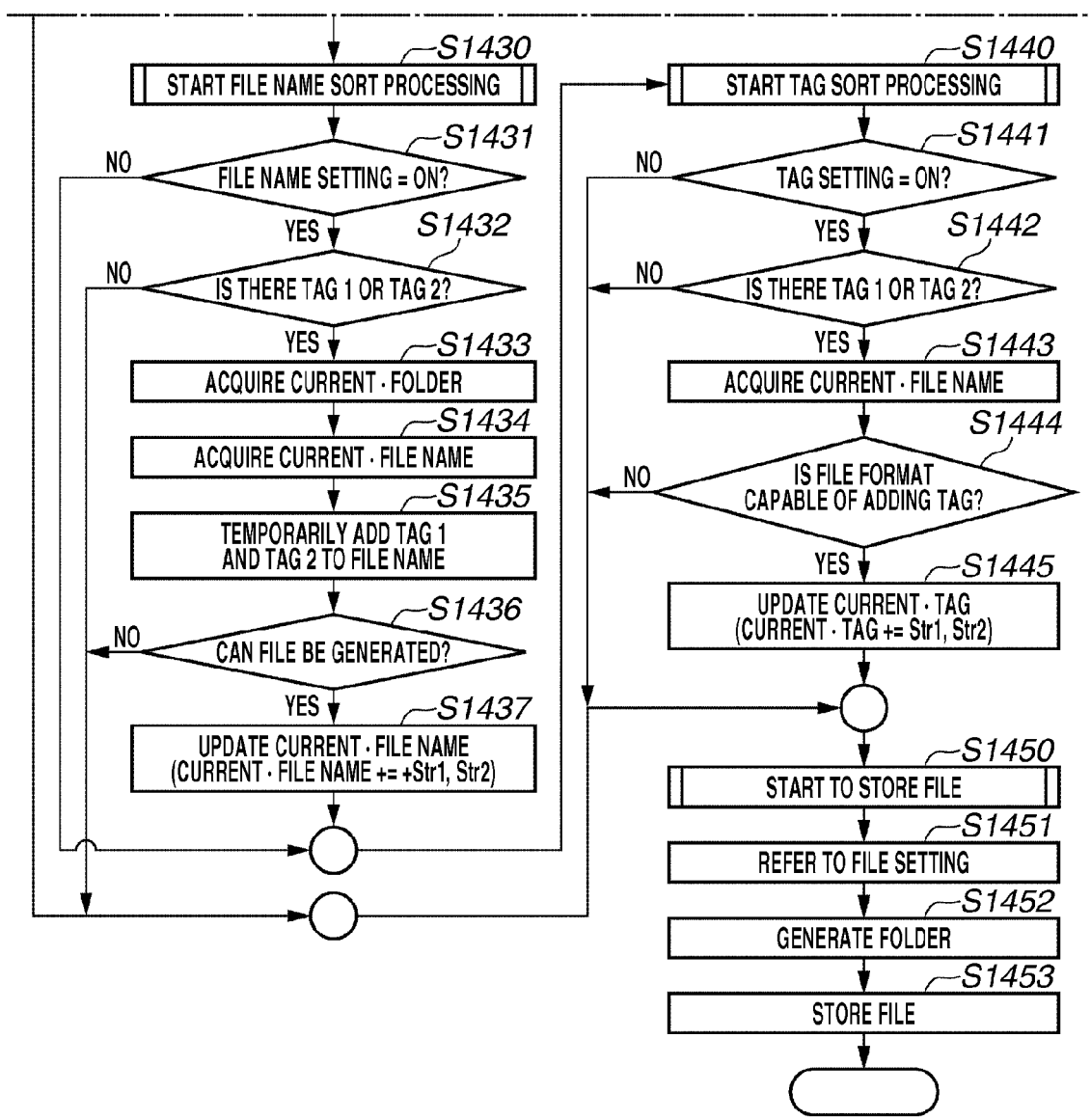

FIG. 13, composed of FIGS. 13A and 13B, is a flowchart illustrating one example of sort processing performed by the information processing unit 30. Each step in the flowchart illustrated in FIG. 13 is performed by controlling and executing a function of the information processing unit 30 serving as software stored in a storage unit such as the ROM 113 and the external storage device 123 of the information processing apparatus 1 by the CPU 111.

In step S1401, the information processing unit 30 starts sort processing.

In step S1402, the information processing unit 30 determines whether a sort setting=ON. If the information processing unit 30 determines that the sort setting=ON (YES in step S1402), the operation proceeds to step S1410. If the sort setting is not ON (NO in step S1402), the operation proceeds to step S1450.

In step S1410, the information processing unit 30 starts to check a tag selection.

In step S1411, the information processing unit 30 refers to the tag selection.

For example, assume that a tag 1=Str1 and a tag 2=Str2 have been selected.

In step S1420, the information processing unit 30 starts folder sort processing. In step S1421, the information processing unit 30 determines whether a folder setting=ON. If the information processing unit 30 determines that the folder setting=ON (YES in step S1421), the operation proceeds to step S1422. If the folder setting is not ON, the operation proceeds to step S1430.

In step S1422, the information processing unit 30 determines whether the tag 1 exists. If the information processing unit 30 determines that the tag 1 exists (YES in step S1422), the operation proceeds to step S1423. If the tag 1 does not exist (NO in step S1422), the operation proceeds to step S1430.

In step S1423, the information processing unit 30 acquires a current•folder.

In step S1424, the information processing unit 30 temporarily sets a folder to current\tag 1.

In step S1425, the information processing unit 30 determines whether a temporary folder can be generated or already exists. If the information processing unit 30 determines that the temporary folder can be generated or already exists (YES in step S1425), the operation proceeds to step S1426. If the temporary folder cannot be generated or does not exist (NO in step S1425), the operation proceeds to step S1430.

In step S1426, the information processing unit 30 updates the current•folder. In one example, the folder becomes current•folder\Str1. Thus, the current•folder+=Str1 is updated.

In step S1430, the information processing unit 30 starts file name sort processing.

In step S1431, the information processing unit 30 determines whether a file name setting=ON. If the information processing unit 30 determines that the file name setting=ON (YES in step S1431), the operation proceeds to step S1432. If the fine name setting is not ON (NO in step S1431), the operation proceeds to step S1440.

In step S1432, the information processing unit 30 determines whether the tag 1 or the tag 2 exists. If the information processing unit 30 determines that the tag 1 or the tag 2 exists (YES in step S1432), the operation proceeds to step S1433. If neither the tag 1 nor the tag 2 exists (NO in step S1432), the operation proceeds to step S1450.

In step S1433, the information processing unit 30 acquires a current•folder.

In step S1434, the information processing unit 30 acquires a current•file name.

In step S1435, the information processing unit 30 temporarily adds the tag 1 and the tag 2 to the file name.

In step S1436, the information processing unit 30 determines whether a file can be generated with a temporary file name. If the information processing unit 30 determines that the file can be generated with a temporary file name (YES in step S1436), the operation proceeds to step S1437. If the file cannot be generated with a temporary file name (NO in step S1436), the operation proceeds to step S1440.

In step S1437, the information processing unit 30 updates the current•file name. In one example, a file name is set by adding Str1 and Str2 to the current•file name. Thus, the current•file name+=(Str1, Str2) is updated.

In step S1440, the information processing unit 30 starts tag sort processing.

In step S1441, the information processing unit 30 determines whether a tag setting=ON. If the information processing unit 30 determines that the tag setting=ON (YES in step S1441), the operation proceeds to step S1442. If the tag setting is not ON (NO in step S1441), the operation proceeds to step S1450.

In step S1442, the information processing unit 30 determines whether the tag 1 or the tag 2 exists. If the information processing unit 30 determines that the tag 1 or the tag 2 exists (YES in step S1442), the operation proceeds to step S1443. If neither the tag 1 nor the tag 2 exists (NO in step S1442), the operation proceeds to step S1450.

In step S1443, the information processing unit 30 acquires the current•file name.

In step S1444, the information processing unit 30 determines whether a file format is capable of adding a tag. If the information processing unit 30 determines that the file format is capable of adding a tag (YES in step S1444), the operation proceeds to step S1445. If the file format is not capable of adding a tag (NO in step S1444), the operation proceeds to step S1450.

In step S1445, the information processing unit 30 updates the current•tag.

In one example, the file tag is set by adding Str1 and Str2. Accordingly, the current•tag+=Str1, Str2 is updated.

In step S1450, the information processing unit 30 starts to store the file.

In step S1451, the information processing unit 30 refers to the file setting.

In step S1452, the information processing unit 30 generates a current•folder. In step S1453, the information processing unit 30 stores the file with the current•file name.

Now, a supplemental description of the flowchart illustrated in FIG. 13 is given.

The flowchart illustrated in FIG. 13 has been described using the case where the tag 1 is only used in the folder sort processing while the number of folder hierarchies remains the same. Alternatively, both of the tags 1 and 2 may be used in the folder sort processing. In such a case, for example, a folder should be current•folder\Str1\Str2.

Unlike the folder sort processing, in the case of the file name sort processing and the tag sort processing described with the flowchart illustrated in FIG. 13, both of the tags 1 and 2 are used, and an amount of the information to the file is increased. Alternatively, any of the tag 1 or the tag 2 may be used in the tag sort processing. In such a case, for example, a file name is set by adding Str1 to a current•file name. Moreover, in this case, for example, Str2 is added to a file•tag. Therefore, in the processing of the sorting method of the information processing unit 30, the number or the order of the selected tags (information elements) can be adjusted.

Moreover, in the flowchart illustrated in FIGS. 13A and 13B, the sort processing from step S1401 and the file storing from step S1450 are described separately. In addition, the flowchart in FIGS. 13A and 13B is described using the case where the sort processing can be turned ON and OFF. The sort processing and the file storing can be performed simultaneously or concurrently.

The sort processing performed by the information processing unit 30 has been described with reference to the flowchart illustrated in FIGS. 13A and 13B.

As for these flowcharts, the programs for the processing to be performed by the information processing apparatus 1 are stored in the external storage device 123 or the ROM 113, so that the programs are read by the RAM 112 and executed by the CPU 111. On the other hand, the programs for the processing to be performed by the image forming apparatus 2 are stored in the external storage device 163 or the ROM 153, so that the programs are read by the RAM 152 and executed by the CPU 151. Moreover, the programs and the data received by communicating with an external unit via the IFC 118 or the IFC 158 are executed by the CPU 111 or the CPU 151. The processing of the present exemplary embodiment has been described.

(Distinctive Processing of The Present Exemplary Embodiment)

Distinctive processing of the present exemplary embodiment is described in detail. In the present system, data can be scanned and sorted simultaneously, thereby achieving labor-saving.

Figure 14A:
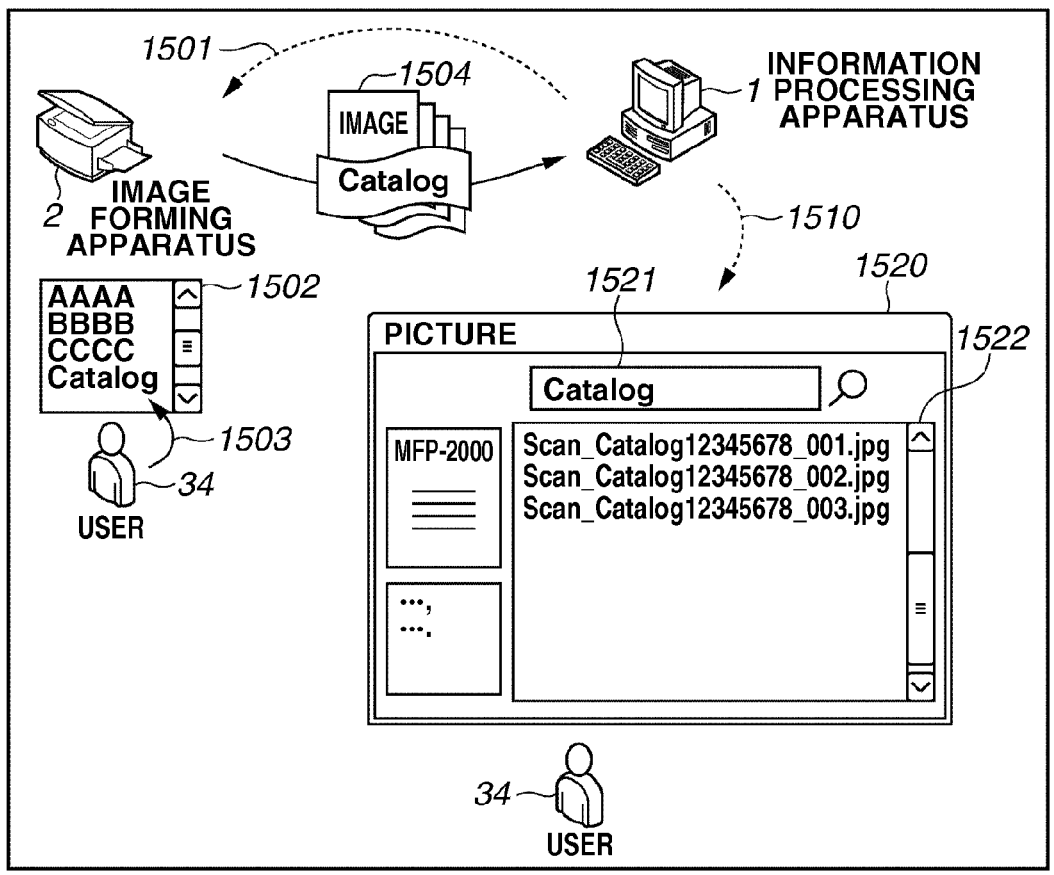
FIG. 14A is a diagram illustrating an operation example of the present exemplary embodiment.

FIG. 14A is a diagram illustrating an effect of an operation example in which the number of scanning operations to be performed by the user 34 is reduced, and the user 34 can readily refer to data.

In the operation example illustrated in FIG. 14A, sorting information 1502 is provided from the information processing apparatus 1 to the image forming apparatus 2, indicated by an arrow 1501. Subsequently, the user 34 selects a tag "Catalog" from the sorting information 1502 displayed on the image forming apparatus 2. Such a selection made by the user 34 is indicated by an arrow 1503 illustrated in FIG. 14A. Then, a plurality of scanned images 1504 with the tag "Catalog" are provided from the image forming apparatus 2 to the information processing apparatus 1, and stored in the information processing apparatus 1. Then, the user 34 refers to the scanned data of catalog as indicated by an arrow 1510 illustrated in FIG. 14A. When the user searches "Catalog" using a search box 1521 of the dialog 1520 on the information processing apparatus 1, images each having a file name "Catalog" are listed in an area 1522.

In this example, the user 34 selects the "Catalog", so that the plurality of images are sorted on the file name basis. Moreover, the user 34 can refer to the file by searching the "Catalog" afterward. In a conventional manner, a user visually identifies each scanned data on an information processing apparatus, and adds "Catalog" to an individual file name. Moreover, the user has difficulty in finding a desired file due to a failure to remember a storage destination or a failure to identify the file. On the other hand, the present system enables a sort operation and a scan operation to be executed simultaneously. Such simultaneous operations can reduce the number of operations, and the user 34 can readily refer to data.

Figure 14B:
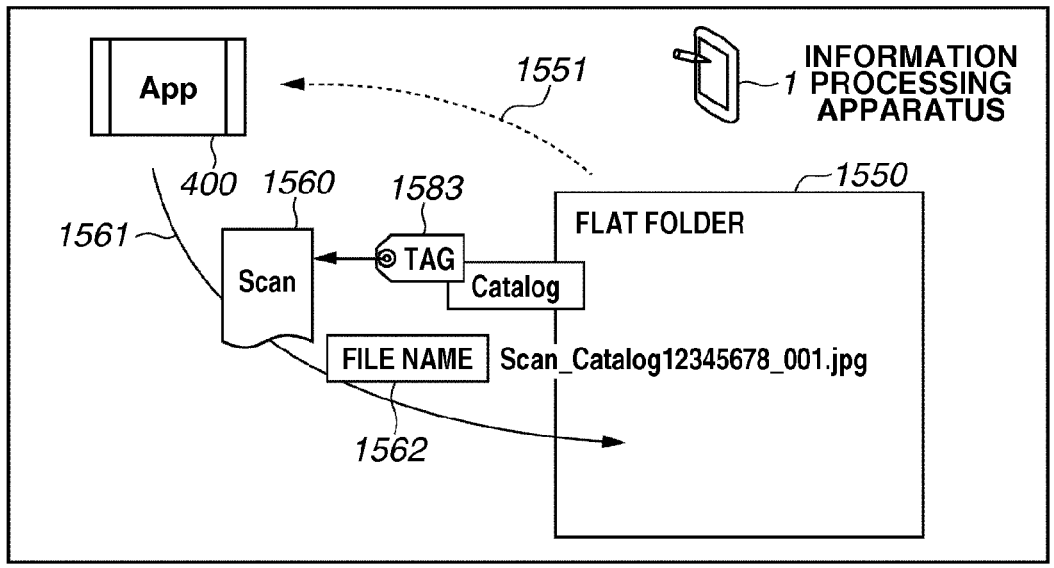
FIG. 14B is another diagram illustrating an operation example of the present exemplary embodiment.

FIG. 14B is a diagram illustrating an operation example in which the user 34 can readily manage an environment and data. A flat folder 1550 of the information processing apparatus 1 is not allowed to have a descendant folder due to OS specifications. The application 400 checks an operation environment as indicated by an arrow 1551. When the application 400 sorts scanned data 1560, the operation indicated by an arrow 1561 illustrated in FIG. 14B is performed. That is, the application 400 selects a sorting method of a file name 1562 or a tag 1583, but does not perform folder sort processing.

In this diagram, the application 400 checks the environment, but does not perform folder sorting processing. The user 34 does not change a setting of the application 400. The stored file has an information element to remain even after a movement is made. In a conventional manner, a user sets a shared folder in an OS, so that the user can add an information element when a file is moved. On the other hand, the present system enables a sort operation and a scan operation to be executed simultaneously, so that the user 34 can readily manage an environment and data.

In a conventional system in which scanned data is stored in a shared folder of a PC, there has been a problem of labor-saving. Classification of scanned data by folder causes difficulty in referring to a file when hierarchical levels cannot be followed, or when a hierarchical level is crossed. Moreover, since an information position is fixed, a file cannot be moved.

The present exemplary embodiment provides a function of adding information used to sort scanned data and a function of controlling a method for sorting the scanned data when a scan operation is executed. Moreover, in the present exemplary embodiment, data is sorted simultaneously with execution of a scan operation, thereby enhancing labor-saving. In addition, the system according to the present exemplary embodiment can handle new data including information arrangement using a tag, and flat storage to a large capacity storage to deal with changes in user environments by the widespread of Web services.

The distinctive processing of the present exemplary embodiment has been described.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each of the above exemplary embodiments, data is sorted simultaneously with execution of a scan operation, thereby enhancing labor-saving. That is, each of the exemplary embodiments can provide a function of adding information used to sort scanned data and a function of controlling a method for sorting the scanned data when a scan operation is executed.

Although the present invention has been described with respect to the exemplary embodiments, the present invention is not limited thereto. The present invention encompasses all modifications and alternations within the scope of the following claims.

For example, each of the present exemplary embodiments has been described using the system including the PC serving as the information processing apparatus and the MFP serving as the image forming apparatus. However, the present exemplary embodiment is not limited to such a structure. For example, an information processing apparatus may be a smart phone as illustrated in FIG. 14B.

According to the present invention, therefore, when the scanned data is sorted and stored in the information processing apparatus, labor-saving can be enhanced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-120872 filed May 28, 2012, which is hereby incorporated by reference herein in its entirety.

What is claimed is:

1. A system comprising an information processing apparatus and an image forming apparatus,
the information processing apparatus comprising:
a setting unit configured to set a sorting information list and a sorting method used for a sort operation;
a list transmission unit configured to transmit the sorting information list set by the setting unit to the image forming apparatus; and
a sorting unit configured to sort scanned data using tag information based on a sorting method set by the setting unit, wherein the sorting unit adds the tag information, based on the set sorting method, to a folder storing the scanned data, to a file name of the scanned data, or to a file of the scanned data, and
the image forming apparatus comprising:
a display unit configured, based on the sorting information list transmitted by the list transmission unit, to display a selection screen on which a user can select tag information from the sorting information list;
a sorting information transmission unit configured to transmit the tag information selected on the selection screen to the information processing apparatus; and
a scanned data transmission unit configured to transmit scanned data to the information processing apparatus.

2. The system according to claim 1, wherein the setting unit displays a setting screen on a display device to cause the user to set the sorting information list and the sorting method, and sets the sorting information list and the sorting method based on a setting operation performed by the user via the setting screen.

3. The system according to claim 2, wherein the setting unit displays the setting screen on the display device, the setting screen being on which the user can select separation of a folder, addition to a file name, or embedment in a file as the sorting method.

4. An information processing apparatus capable of communicating with an image forming apparatus via a network, the information processing apparatus comprising:
a setting unit configured to set a sorting information list and a sorting method used for a sort operation; and
a list transmission unit configured to transmit the sorting information list set by the setting unit to the image forming apparatus;
a sorting information receiving unit configured to receive tag information from the image forming apparatus, the tag information being selected from the sorting information list on a selection screen of the image forming apparatus;
a scanned data receiving unit configured to receive scanned data from the image forming apparatus, the scanned data having undergone a scan operation performed by the image forming apparatus; and a sorting unit configured to sort the scanned data using the tag information based on the sorting method set by the setting unit, wherein the sorting unit adds, based on the set sorting method, the tag information to a folder storing the scanned data, a file name of the scanned data, or a file of the scanned data.

5. The information processing apparatus according to claim 4, wherein the setting unit displays a setting screen on a display device to cause a user to set the sorting information list and the sorting method, and sets the sorting information list and the sorting method based on a setting operation performed by the user via the setting screen.

6. The information processing apparatus according to claim 5, wherein the setting unit displays the setting screen on the display device, the setting screen being on which the user can select separation of a folder, addition to a file name, or embedment in a file as the sorting method.

7. An information processing method performed by a system comprising an information processing apparatus and an image forming apparatus, the method comprising:
setting, by the information processing apparatus, a sorting information list and a sorting method used for a sort operation;
transmitting, by the information processing apparatus, the set sorting information list to the image forming apparatus;
displaying, by the image forming apparatus, a selection screen on which a user can select tag information from the sorting information list based on the transmitted sorting information list transmitted;
transmitting, by the image forming apparatus, the tag information selected on the selection screen to the information processing apparatus;
transmitting, by the image forming apparatus, scanned data to the information processing apparatus; and
sorting, by the information processing apparatus, the scanned data using the sorting information based on the set sorting method, wherein the sorting adds, based on the set sorting method, the tag information to a folder storing the scanned data, a file name of the scanned data, or a file of the scanned data.

8. An information processing method executed by an information processing apparatus capable of communicating with an image forming apparatus via a network, the method comprising:
setting a sorting information list and a sorting method used for a sort operation;
transmitting the set sorting information list to the image forming apparatus;
receiving tag information from the image forming apparatus, the tag information being selected from the sorting information list on a selection screen of the image forming apparatus;
receiving scanned data from the image forming apparatus, the scanned data having undergone a scan operation performed by the image forming apparatus; and
sorting the scanned data using the tag information based on the set sorting method, wherein the sorting adds, based on the set sorting method, the tag information to a folder storing the scanned data, a file name of the scanned data, or a file of the scanned data.

9. A non-transitory computer readable storage medium storing a program for causing a computer capable of communicating with an image forming apparatus via a network to execute a method comprising:
setting a sorting information list and a sorting method used for a sort operation;
transmitting the set sorting information list to the image forming apparatus;
receiving tag information from the image forming apparatus, the tag information being selected from the sorting information list on a selection screen of the image forming apparatus;
receiving scanned data from the image forming apparatus, the scanned data having undergone a scan operation performed by the image forming apparatus; and
sorting the scanned data using the tag information based on the set sorting method, wherein the sorting adds, based on the set sorting method, the tag information to a folder storing the scanned data, a file name of the scanned data, or a file of the scanned data.

* * * * *